United States Patent
Hansen et al.

(10) Patent No.: US 11,148,333 B2
(45) Date of Patent: Oct. 19, 2021

(54) LINEAR TO LINEAR VALVE PIN DRIVE DURING INJECTION CYCLE

(71) Applicant: Synventive Molding Solutions, Inc., Peabody, MA (US)

(72) Inventors: Deven Hansen, Somerville, MA (US); Jessica Scolnic, Somerville, MA (US)

(73) Assignee: Synventive Molding Solutions, Ino., Peabody, MA (US)

( * ) Notice: Subject to any disclaimer, the term of this patent is extended or adjusted under 35 U.S.C. 154(b) by 224 days.

(21) Appl. No.: 16/486,861

(22) PCT Filed: Apr. 16, 2018

(86) PCT No.: PCT/US2018/027745
§ 371 (c)(1),
(2) Date: Aug. 19, 2019

(87) PCT Pub. No.: WO2018/194961
PCT Pub. Date: Oct. 25, 2018

(65) Prior Publication Data
US 2021/0129400 A1   May 6, 2021

Related U.S. Application Data
(60) Provisional application No. 62/486,563, filed on Apr. 18, 2017.

(51) Int. Cl.
*B29C 45/28* (2006.01)

(52) U.S. Cl.
CPC ...... *B29C 45/281* (2013.01); *B29C 2045/282* (2013.01); *B29C 2045/2824* (2013.01);
(Continued)

(58) Field of Classification Search
CPC ............ B29C 45/281; B29C 2045/282; B29C 2045/2824; B29C 2045/2834; B29C 2045/2865
See application file for complete search history.

(56) References Cited

U.S. PATENT DOCUMENTS 4,212,627 A * 7/1980 Gellert ................. B29C 45/281
                                                    222/505
4,330,258 A * 5/1982 Gellert ................. B29C 45/281
                                                    251/250
(Continued)

FOREIGN PATENT DOCUMENTS

CN         203077534 U      7/2013
DE         19532978 A1      3/1997
(Continued)

OTHER PUBLICATIONS

Communication under Rule 71(3) EPC, Intention to Grant in corresponding European Application No. 18723120.4 dated Jan. 2, 2020.

(Continued)

*Primary Examiner* — Xiao S Zhao
*Assistant Examiner* — Emmanuel S Luk
(74) *Attorney, Agent, or Firm* — Polsinelli, P.C.

(57) ABSTRACT

An injection molding system (5) comprised of:
a valve (10) comprising an actuator (1000) that includes a linear drive member (150, 154, 158) adapted to travel along a first linear path of travel (L1),
a valve pin (80) adapted to travel linearly upstream and downstream within the flow passage (15) between pin upstream (81) and pin downstream (82) positions along a second linear path of travel (L2) that is non-coaxial relative to the first linear path of travel (L1),
the actuator (1000) being interconnected to the valve pin (80) in an arrangement wherein movement of the linear drive member (150, 154, 158) along the first linear path of travel (L1) drives the valve pin (80) along the second linear path of travel (L2).

15 Claims, 19 Drawing Sheets

(52) U.S. Cl.
CPC ............... *B29C 2045/2834* (2013.01); *B29C 2045/2865* (2013.01)

(56) References Cited

U.S. PATENT DOCUMENTS

| | | | | |
|---|---|---|---|---|
| 4,449,915 | A * | 5/1984 | van den Brink | B29C 45/2806 425/564 |
| 5,198,238 | A * | 3/1993 | Baxi | B29C 45/1734 264/40.3 |
| 5,238,378 | A * | 8/1993 | Gellert | B29C 45/1603 264/328.9 |
| 6,113,381 | A * | 9/2000 | Gellert | B29C 45/1603 264/328.9 |
| 6,722,874 | B1 * | 4/2004 | Moser | B29C 45/281 425/564 |
| 7,452,201 | B2 * | 11/2008 | Ciccone | B29C 45/281 425/564 |
| 8,220,362 | B2 * | 7/2012 | Uracz | B29C 45/281 74/567 |
| 9,452,557 | B2 * | 9/2016 | Keitel | B29C 45/2806 |
| 2009/0017154 | A1 * | 1/2009 | Gunther | B29C 45/281 425/565 |
| 2009/0100962 | A1 * | 4/2009 | Uracz | B29C 45/281 74/567 |
| 2009/0220636 | A1 * | 9/2009 | Gunther | B29C 45/281 425/564 |
| 2009/0311357 | A1 * | 12/2009 | Gunther | B29C 45/281 425/145 |
| 2015/0014887 | A1 * | 1/2015 | Keitel | B29C 45/2725 264/328.8 |
| 2018/0345553 | A1 * | 12/2018 | Stoll | B29C 45/281 |

FOREIGN PATENT DOCUMENTS

| | | |
|---|---|---|
| DE | 19955320 C1 | 3/2001 |
| DE | 102011106606 A1 | 12/2012 |
| DE | 202014103153 U1 | 10/2014 |
| DE | 202014103153 U1 | 12/2014 |
| DE | 102015208145 A1 | 11/2016 |
| EP | 0279400 A2 | 8/1988 |
| KR | 20080005268 U | 11/2008 |
| KR | 2020080005268 U | 11/2008 |

OTHER PUBLICATIONS

International Search Report and Written Opinion in corresponding international application No. PCT/US2018/027745 dated Jul. 9, 2018.
International Preliminary Report on Patentability in corresponding international application No. PCT/US2018/027745 dated Jun. 25, 2019.
International Search Report and Written opinion dated Jul. 9, 2018 in corresponding international application PCT/US2018/027745.
International Preliminary Report on Patentability dated Jun. 25, 2019 in corresponding international application PCT/US2018/027745.
Communication pursuant to Article 94(3) EPC in corresponding EP application No. 18723120.4 dated Oct. 16, 2019.

* cited by examiner

LINEAR TO LINEAR VALVE PIN DRIVE DURING INJECTION CYCLE

RELATED APPLICATIONS

This application is a US National Stage of PCT/US18/27745 filed Apr. 16, 2018, which claims the benefit of priority to U.S. Application Ser. No. 62/486,563 filed Apr. 18, 2017, the disclosures of which are incorporated by reference as if fully set forth herein.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300 (7006), U.S. Pat. Nos. 6,419,870, 6,464,909 (7031), U.S. Pat. Nos. 6,599,116, 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068), U.S. application Ser. No. 10/101,278 filed Mar. 19, 2002 (7070) and PCT Application No. PCT/US11/062099 (7100WO0) and PCT Application No. PCT/US11/062096 (7100WO1), U.S. Pat. Nos. 8,562,336, 8,091,202 (7097US1) and U.S. Pat. No. 8,282,388 (7097US2), U.S. Pat. No. 9,724,861 (7129US4), U.S. Pat. No. 9,662,820 (7129US3), Publication No. WO2015006261 (7135WO0), Publication No. WO2014209857 (7134WO0), Publication No. WO2016153632 (7149WO2), International publication no. WO2016153704 (7149WO4), U.S. Pat. No. 9,205,587 (7117US0), U.S. application Ser. No. 15/432,175 (7117US2) filed Feb. 14, 2017, U.S. Pat. No. 9,144,929 (7118US0), U.S. Publication No. 20170341283 (7118US3), International Application PCT/US17/043029 (7165WO0) filed Jul. 20, 2017, International Application PCT/US17/043100 (7165WO1), filed Jul. 20, 2017 and International Application PCT/US17/036542 (7163WO0) filed Jun. 8, 2017, International Application PCT/US18/017422 filed Feb. 8, 2018 (7172WO0), PCT/US18/021907 filed Mar. 12, 2018 (7173WO0), U.S. application Ser. No. 15/648,588 filed Jul. 13, 2017 (7129US7).

BACKGROUND OF THE INVENTION

Injection molding systems have been developed having flow control mechanisms that control the movement of a valve pin over the course of an injection cycle to cause the pin to move either upstream or downstream over the course of the injection cycle using rotary motion that is converted to linear motion such as disclosed in U.S. Pat. No. 9,346,206.

SUMMARY OF THE INVENTION

An actuator 1000, FIGS. 1, 1A as used in a system according to the invention typically comprises an electrically powered motor having a bearing 152 that rotatably mounts either a nut 154 or a screw 158 to the housing 64 of the actuator 1000. Either the nut 154 or screw 158 can be attached to an electromagnetic coil 174 that when energized by electrical power input causes the nut 154 or screw 158 to be drivably rotated around the linear travel axis L1, FIGS. 1A, 1B, 19. As shown the screw 158 and nut 154 are screwably engaged via complementary threads 156a. In the FIG. 1 embodiment, the nut 154 is attached to the coil 174 and is rotatably driven R1 around the travel axis L1. In the FIG. 1A embodiment the screw 158 is attached to the coil 174 and rotatably driven R2. In the FIG. 1 embodiment, the screw 158 acts as the linear drive member 150. In the FIG. 1A embodiment, the nut 154 acts as the linear drive member 150.

In accordance with the invention there is provided an injection molding system (5) comprised of an injection molding machine (IMM), a distribution manifold (6) for receiving a selected injection fluid (F) from the injection molding machine (IMM), a valve (10) comprising a flow passage (15) receiving the injection fluid (F) from the manifold (6) having a longitudinal length (L) and a downstream tip end exit aperture (20), a mold (7) having a cavity (60) having a cavity entrance aperture (30), the exit aperture (20) being fluid sealably matable with the cavity entrance aperture (30) to form a gate aperture (50), the injection molding machine (IMM) injecting a selected injection fluid (F) to the manifold (6) which distributes the injection fluid for injection downstream through the flow passage (15) of the valve (10) and further downstream to and through the exit aperture (20) and further downstream to and through the gate aperture (50) into the cavity (60) of the mold (7), the valve (10) comprising an actuator (1000) that includes a linear drive member (150, 154, 158) that is reciprocally driven back and forth along a first linear path of travel (L1), a valve pin (80) that is adapted to travel linearly upstream and downstream within the flow passage (15) between pin upstream (81) and pin downstream (82) positions along a second linear path of travel (L2) that is non-coaxial relative to the first linear path of travel (L1), the actuator (1000) being interconnected to the valve pin (80) in an arrangement wherein movement of the linear drive member (150, 154, 158) along the first linear path of travel (L1) drives the valve pin (80) along the second linear path of travel (L2).

The linear drive member (150, 154, 158) is typically interconnected to an upstream end (502) of a linear to linear travel converter (500) and the valve pin (80) is interconnected to a downstream end (504) of the linear to linear travel converter (500).

The linear to linear travel converter (500) can pivot or travel linearly along the first linear path of travel (L1) in response to being driven by the linear drive member (150, 154, 158).

The linear drive member (150, 154, 158) is typically adapted to travel between an upstream drive position (151) and a downstream drive position (152) that correspond respectively to travel of the valve pin (80) between the pin upstream (81) and pin downstream (82) positions, the linear to linear travel converter (500) being adapted to mechanically change velocity (V) of travel of the valve pin (80) during the course of travel of the valve pin (80) between the pin upstream (81) and pin downstream (82) positions when the linear drive member is driven at a constant velocity (CV).

The linear drive member (150, 154, 158) preferably travels between an upstream drive position (151) and a downstream drive position (152) that correspond respectively to travel of the valve pin (80) between the pin upstream (81) and pin downstream (82) positions, the linear to linear travel converter (500) being adapted to mechanically change velocity (V) of travel of the valve pin (80) during the course of travel of the valve pin (80) between the pin upstream (81) and pin downstream (82) positions when the linear drive member is driven at a constant velocity.

The linear to linear travel converter can include a velocity adjuster (507) interconnected at an upstream end (507u) to the linear drive member (150, 154, 158) and at a downstream end (507d) to the valve pin (80), the velocity adjuster (507) being adapted to mechanically change velocity (V) of travel of the valve pin (80) during the course of travel of the valve pin (80) between the pin upstream (81) and pin downstream (82) positions when the linear drive member is driven at a constant velocity.

The actuator (1000) typically comprises an electric motor or electrically powered device.

The actuator (1000) can includes a screw (158) or a nut (154) that is rotatably driven by the electric motor or electrically powered device, the screw (158) or nut (154) being screwably engaged with the linear drive member (150, 154, 158) in an arrangement wherein the linear drive member (150, 154, 158) is driven along the first linear path of travel (L1) on driven rotation of the screw (158) or nut (154).

The system can further include a position detector (178) that senses linear position of the valve pin (80).

The system can further include a controller (176) that includes a program that receives a position detection signal from the position detector (178), the program including instructions that controllably drive the actuator (1000) based on use of the position detection signal as an input.

The position detector can comprise a Hall effect sensor.

The controller (176) preferably includes instructions that control rate, direction or timing of driven movement of the actuator (1000) during the course of an injection cycle.

In another aspect of the invention there is provided a method of performing an injection cycle comprising injecting a selected injection fluid (F) into a cavity (60) of a mold (7) using a system as described above.

In another aspect of the invention there is provided, in an injection molding system (5) comprised of an injection molding machine (IMM), a distribution manifold (6) for receiving a selected injection fluid (F) from the injection molding machine (IMM), a valve (10) comprising a flow passage (15) receiving the injection fluid (F) from the manifold (6) having a longitudinal length (L) and a downstream tip end exit aperture (20), a mold (7) having a cavity (60) having a cavity entrance aperture (30), the exit aperture (20) being fluid sealably matable with the cavity entrance aperture (30) to form a gate aperture (50), wherein the injection molding machine (IMM) injects a selected injection fluid (F) to the manifold (6) which distributes the injection fluid for injection downstream through the flow passage (15) of the valve (10) and further downstream to and through the exit aperture (20) and further downstream to and through the gate aperture (50) into the cavity (60) of the mold (7), a valve (10) comprising an actuator (1000) that includes a linear drive member (150, 154, 158) that is reciprocally driven back and forth along a first linear path of travel (L1), a valve pin (80) that is adapted to travel linearly upstream and downstream within the flow passage (15) between pin upstream (81) and pin downstream (82) positions along a second linear path of travel (L2) that is non-coaxial relative to the first linear path of travel (L1), the actuator (1000) being interconnected to the valve pin (80) in an arrangement wherein movement of the linear drive member (150, 154, 158) along the first linear path of travel (L1) drives the valve pin (80) along the second linear path of travel (L2).

In such a valve the linear drive member (150, 154, 158) is typically interconnected to an upstream end (502) of a linear to linear travel converter (500) and the valve pin (80) is interconnected to a downstream end (504, 507d) of the linear to linear travel converter (500).

The linear to linear travel converter (500) can pivot or travel linearly along the first linear path of travel (L1) in response to being driven by the linear drive member (150, 154, 158).

The linear drive member (150, 154, 158) preferably travels between an upstream drive position (151) and a downstream drive position (152) that correspond respectively to travel of the valve pin (80) between the pin upstream (81) and pin downstream (82) positions, the linear to linear travel converter (500) being adapted to mechanically change velocity (V) of travel of the valve pin (80) during the course of travel of the valve pin (80) between the pin upstream (81) and pin downstream (82) positions when the linear drive member is driven at a constant velocity.

The linear to linear travel converter can include a velocity adjuster (507) interconnected at an upstream end (507u) to the linear drive member (150, 154, 158) and at a downstream end (507d) to the valve pin (80), the velocity adjuster (507) being adapted to mechanically change velocity (V) of travel of the valve pin (80) during the course of travel of the valve pin (80) between the pin upstream (81) and pin downstream (82) positions when the linear drive member is driven at a constant velocity.

The actuator (1000) typically comprises an electric motor or electrically powered device.

The actuator (1000) can includes a screw (158) or a nut (154) that is rotatably driven by the electric motor or electrically powered device, the screw (158) or nut (154) being screwably engaged with the linear drive member (150, 154, 158) in an arrangement wherein the linear drive member (150, 154, 158) is driven along the first linear path of travel (L1) on driven rotation of the screw (158) or nut (154).

The valve can further include a position detector (178) that senses linear position of the valve pin (80).

The valve can further include a controller (176) that includes a program that receives a position detection signal from the position detector (178), the program including instructions that controllably drive the actuator (1000) based on use of the position detection signal as an input.

The position detector can comprise a Hall effect sensor.

The controller (176) preferably includes instructions that control rate, direction or timing of driven movement of the actuator (1000) during the course of an injection cycle.

In another aspect of the invention there is provided a method of performing an injection cycle comprising injecting a selected injection fluid (F) into a cavity (60) of a mold (7) using a valve as described above.

In another aspect of the invention there is provided an injection molding system (5) comprised of an injection molding machine (IMM), a distribution manifold (6) for receiving a selected injection fluid (F) from the injection molding machine (IMM), a valve (10) comprising a flow passage (15) receiving the injection fluid (F) from the manifold (6) having a longitudinal length (L) and a downstream tip end exit aperture (20), a mold (7) having a cavity (60) having a cavity entrance aperture (30), the exit aperture (20) being fluid sealably matable with the cavity entrance aperture (30) to form a gate aperture (50), wherein the injection molding machine (IMM) injects a selected injection fluid (F) to the manifold (6) which distributes the injection fluid for injection downstream through the flow passage (15) of the valve (10) and further downstream to and through the exit aperture (20) and further downstream to and through the gate aperture (50) into the cavity (60) of the mold (7), a valve (10) comprising an actuator (1000) that includes a linear drive member (150, 154, 158) that is reciprocally driven back and forth along a first linear path of travel (L1), a valve pin (80) that is adapted to travel linearly upstream and downstream within the flow passage (15) between pin upstream (81) and pin downstream (82) positions along a second linear path of travel (L2) that is non-coaxial relative to the first linear path of travel (L1), a linear to linear travel converter (500) interconnected to the linear drive member (159, 154, 158) in an arrangement such that the linear to linear travel converter (500) is drivable along the first linear path (L1), the linear to linear travel converter (500) including a slot (509) that receives a follower (520) interconnected to an upstream end (80h) of the valve pin (80), the slot (509) being driven along the first linear path (L1) together with travel of the linear to linear travel converter (500), the follower (520) being adapted to slide along a guide surface (509s) within the slot (509), the guide surface (509s) being configured to drive the valve pin (80) along the second linear path of travel (L2) at one or more speeds or velocities of linear travel (V) when the linear drive member (159, 154, 158) is driven at a constant velocity (CV).

The guide surface (509s) is preferably configured to drive the valve pin (80) at at least two different speeds or velocities (V) during the course of travel of the valve pin (80) between the pin upstream (81) and pin downstream (82) positions.

In another aspect of the invention there is provided a method of performing an injection cycle comprising injecting a selected injection fluid (F) into a cavity (60) of a mold (7) using an apparatus according to claim 26.

In another aspect of the invention there is provided in an injection molding system (5) comprised of an injection molding machine (IMM), a distribution manifold (6) for receiving a selected injection fluid (F) from the injection molding machine (IMM), a valve (10) comprising a flow passage (15) receiving the injection fluid (F) from the manifold (6) having a longitudinal length (L) and a downstream tip end exit aperture (20), a mold (7) having a cavity (60) having a cavity entrance aperture (30), the exit aperture (20) being fluid sealably matable with the cavity entrance aperture (30) to form a gate aperture (50), wherein the injection molding machine (IMM) injects a selected injection fluid (F) to the manifold (6) which distributes the injection fluid for injection downstream through the flow passage (15) of the valve (10) and further downstream to and through the exit aperture (20) and further downstream to and through the gate aperture (50) into the cavity (60) of the mold (7), a valve (10) comprising an actuator (1000) that includes a linear drive member (150, 154, 158) that is reciprocally driven back and forth along a first linear path of travel (L1), a valve pin (80) that is adapted to travel linearly upstream and downstream within the flow passage (15) between pin upstream (81) and pin downstream (82) positions along a second linear path of travel (L2) that is non-coaxial relative to the first linear path of travel (L1), a linear to linear travel converter (500) having an upstream end (507u) interconnected to and drivable along the first linear path (L1) by the linear drive member (159, 154, 158), a downstream end (507d) interconnected to an upstream end (80h) of the valve pin (80) in an arrangement adapted to drive the valve pin (80) along the second linear path of travel (L2) at one or more speeds or velocities of linear travel (V) when the linear drive member (159, 154, 158) is driven at a constant velocity (CV).

The linear to linear travel converter (500) is typically adapted to drive the valve pin (80) at at least two different speeds or velocities (V) during the course of travel of the valve pin (80) between the pin upstream (81) and pin downstream (82) positions when the linear drive member (159, 154, 158) is driven at a constant velocity (CV).

The linear to linear travel converter (500) can comprise a slide (530) interconnected to an upstream end (80h) of the valve pin (80) and adapted to mount the valve pin (80) for sliding movement along the second linear path of travel (L2), the linear to linear travel converter (500) including a link device (540) pivotably interconnected between the linear drive member (150, 154, 158) and the slide (530), the link device (540) being adapted to drive the valve pin (80) along the first linear path of travel (L2) and the slide (530) along a complementary linear path of travel (L2a).

In another aspect of the invention there is provided a method of performing an injection cycle comprising injecting a selected injection fluid (F) into a cavity (60) of a mold (7) using an apparatus as described above.

In another aspect of the invention there is provided an injection molding system (5) comprised of an injection molding machine (IMM), a distribution manifold (6) for receiving a selected injection fluid (F) from the injection molding machine (IMM), a valve (10) comprising a flow passage (15) receiving the injection fluid (F) from the manifold (6) having a longitudinal length (L) and a downstream tip end exit aperture (20), a mold (7) having a cavity (60) having a cavity entrance aperture (30), the exit aperture (20) being fluid sealably matable with the cavity entrance aperture (30) to form a gate aperture (50), wherein the injection molding machine (IMM) injects a selected injection fluid (F) to the manifold (6) which distributes the injection fluid for injection downstream through the flow passage (15) of the valve (10) and further downstream to and through the exit aperture (20) and further downstream to and through the gate aperture (50) into the cavity (60) of the mold (7), the system (5) including a valve (10) comprising an actuator (1000) that includes a linear drive member (150, 154, 158) that is reciprocally driven back and forth along a first linear path of travel (L1), a valve pin (80) that is adapted to travel linearly upstream and downstream within the flow passage (15) between pin upstream (81) and pin downstream (82) positions along a second linear path of travel (L2) that is non-coaxial relative to the first linear path of travel (L1), a linear to linear travel converter (500) having an upstream end (507u) interconnected to and drivable along the first linear path (L1) by the linear drive member (159, 154, 158), a downstream end (507d) interconnected to an upstream end (80h) of the valve pin (80) in an arrangement adapted to drive the valve pin (80) along the second linear path of travel (L2) at one or more speeds or velocities of linear travel (V) when the linear drive member (159, 154, 158) is driven at a constant velocity (CV).

DETAILED DESCRIPTION OF THE INVENTION

Figure 1:
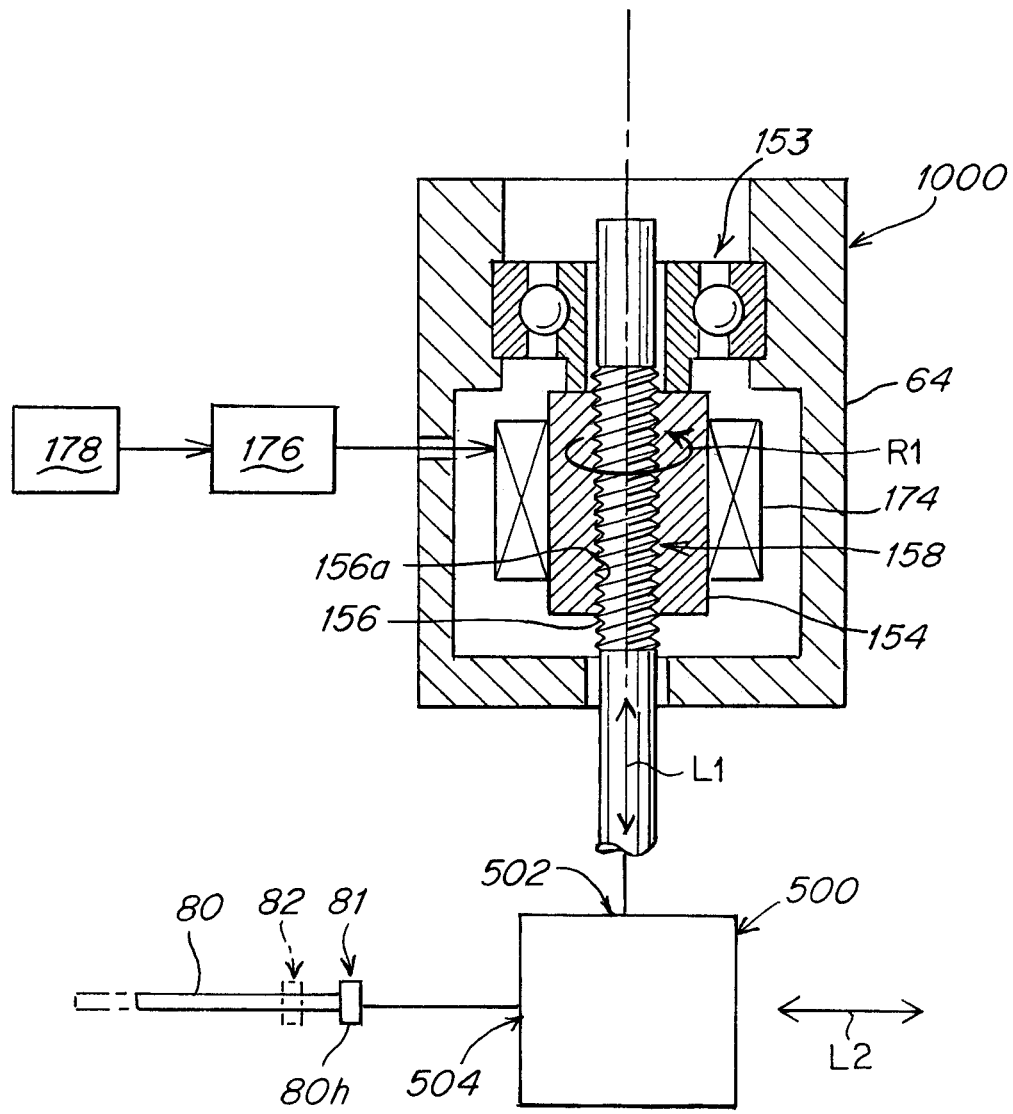
FIG. 1 is a schematic sectional view of an electrically powered actuator having a rotatably driven nut interconnected to a linear to linear movement conversion device.
Figure 1A:
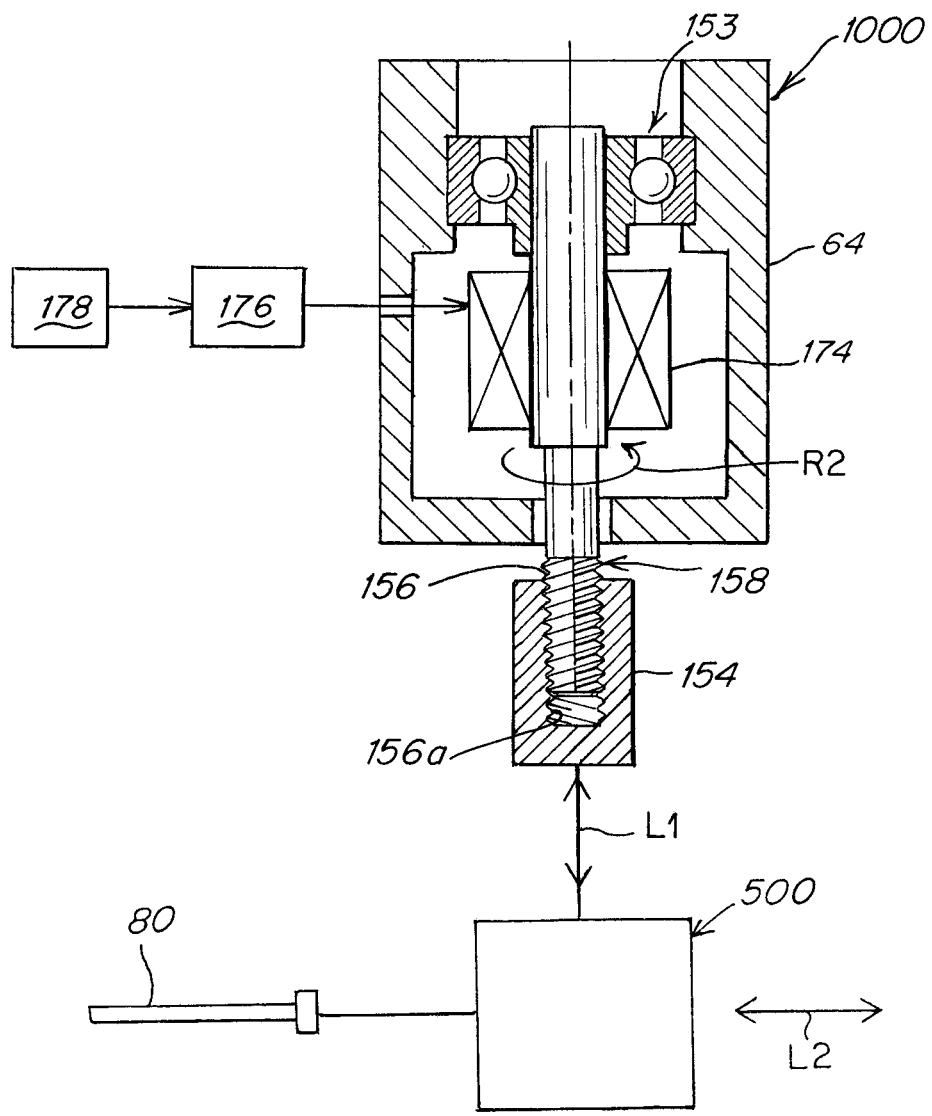
FIG. 1A is a schematic sectional view of an electrically powered actuator having a rotatably driven screw interconnected to a linear to linear movement conversion device.

FIG. 1 shows an embodiment of the invention where the actuator 1000 comprises and electric motor comprised of an electrically powered coil 174 attached to a nut or ball screw 154 that is fixedly attached to the inner race of a bearing 153 the outer race of which is fixedly mounted to the housing 64 of the actuator 100. When the coil 174 of the motor is energized by electric power or energy rotational force R1 is applied to the nut or ball screw 154 thus controllably rotating the nut or ball screw 154. The rotating ball screw or nut 154 is in turn screwably engaged with a complementary screw or threaded shaft 158 which is driven linearly along a first selected linear path of travel L1 by virtue of its screwable engagement with the rotatably driven nut or ball screw 154.

Figure 2:
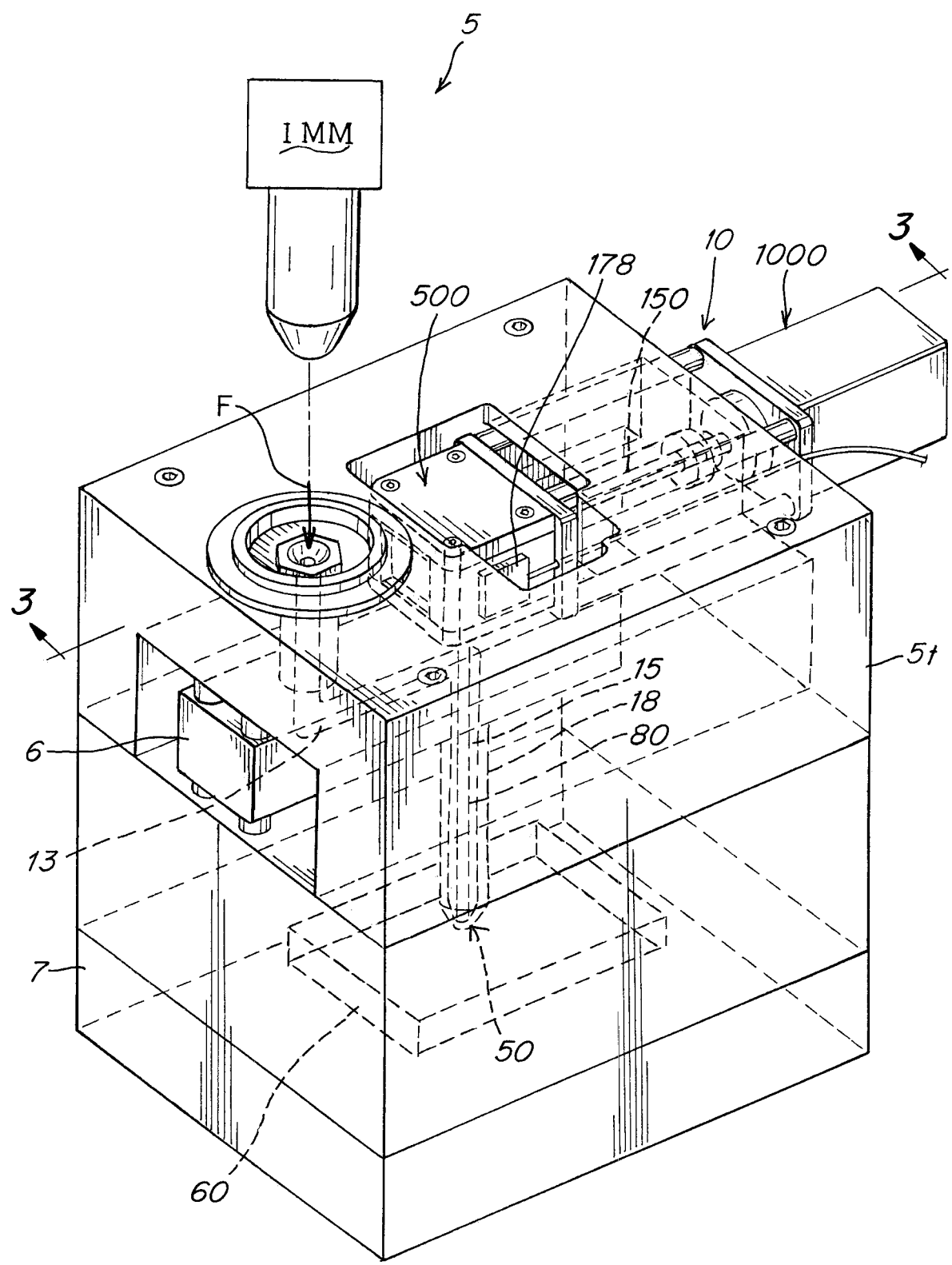
FIG. 2 is a top right side schematic perspective view of an injection molding system incorporating an electric actuator with linear to linear movement conversion device of FIG. 1 or 2.

FIG. 2 shows an alternative embodiment of an actuator 1000 that effects a first linear path of driven travel L1. In the FIG. 2 embodiment, a threaded shaft or screw 158 is alternatively fixedly mounted to the inner race of a bearing 153 the outer race of which is fixedly mounted to the actuator housing 64. The electric coil 174 of the actuator motor is fixedly attached to the screw 158 such that the screw 158 is rotatably driven R2 when the motor coil 174 is energized by electric power. The threaded 156 screw shaft 158 is threadably engaged with a complementary ball screw or nut 154 that it linearly driven L1 by driven rotation R2 of the threaded shaft or screw 158.

As shown in FIGS. 1, 2 the linearly driven component, 158 or 154 is interconnected as described below to the upstream end 502 of a linear to linear motion converter 500 which is interconnected at a downstream end 504 to the upstream end 81 of a valve pin 80. As shown the valve pin 80 is driven along a separate linear path of travel L2 by virtue of the conversion of the linear motion L1 of the drive member 158, 154 to the linear motion L2 by the linear motion converter 500.

Figure 19:
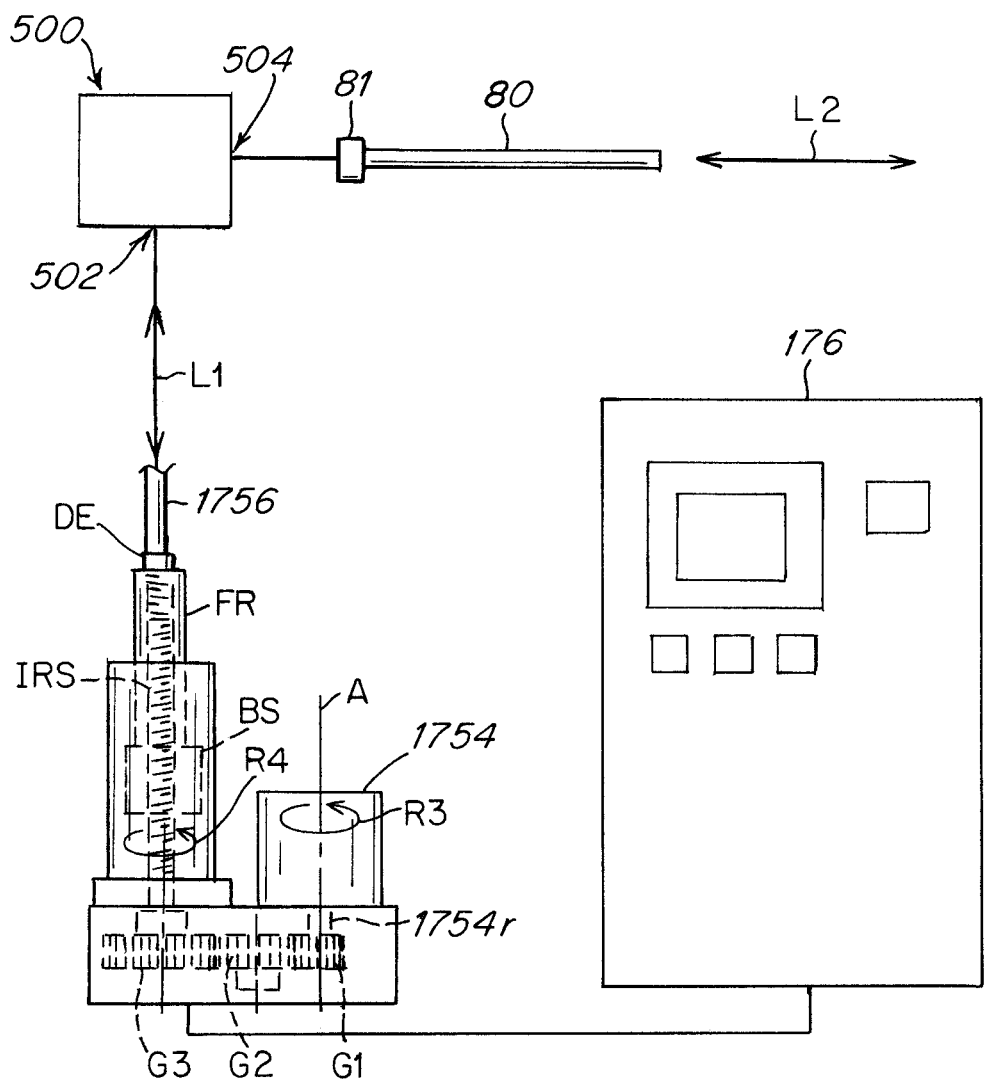
FIG. 19 is a side schematic view of another embodiment of the invention where the actuator drive shaft or rotor is rotatably and non coaxially interconnected to a separate linear drive shaft via a series of speed and torque changing gears.

In another alternative embodiment as shown in FIG. 19, a rotary electric actuator 1754 having a rotatably driven drive shaft 1754r is interconnected to another linear motion drive system that is comprised of a rotary or rotatably driven shaft or threaded screw IRS, a ball screw or nut BS and an interconnected drive shaft 1756 that is driven along a first linear path of travel L1. In the FIG. 19 embodiment the rotatably driven shaft 1754r of the electric actuator 1754 is arranged along an axis A in a non coaxial configuration relative to the linearly driven follower FR and linearly driven shaft 1756 of the actuator 1754 that travels along the first linear path of travel L1, FIG. 19. The rotatably driven R3 shaft 1754R of the electric actuator 1754 as shown is drivably interconnected to the rotatably driven R4 screw component IRS via a series of meshed speed reducing (or speed increasing) gears G1, G2, G3 such that the speed and torque of the non coaxially aligned screw IRS is selectively increased or decreased relative to the speed and torque of the driven shaft 1754r of the electric motor actuator 1754. The drive screw IRS is screwably interconnected to ball screw or nut BS. Gear G3 is rigidly connected to the threaded screw shaft IRS which is rotatably driven R4 by and together with rotation of meshed gears G1 and G2. The ball screw BS is interconnected to a follower FR which is driven along a linear path of travel or linearly L1 by the rotation R4 of shaft IRS and the rotation R3 of interconnected rotor 1754r. The distal or upstream end the follower FR is attached to (or can be integral with) the downstream end DE of the intermediate linear motion shaft 1756. An upstream end 502 of the linearly driven shaft 1756 is interconnected to the linear to linear motion converter 500 in a manner similar to that described regarding the converter 500 configurations herein. The converter 500 is interconnected at its downstream end 504 to the upstream end 81 of the valve pin 80 driving the valve pin along the second linear axis of movement L2, FIG. 19. Thus the nut or ball screw BS, threaded screw IRS and gears G1, G2, G3 convert the rotary motion R3 of the actuator 1754 to a linear drive motion L1 that is not coaxial with the rotary axis A of the electric motor and enables increase or decrease in torque or speed of the electric actuator rotor.

A controller 176 is interconnected to the electric motor and coil 174 and contains a program that includes programmable instructions that can be used to control the back and forth or upstream and downstream linear movement L1 of the actuator such that concomitant linear movement L2 of a valve pin 80 can be controlled between downstream gate closed and one or more upstream gate open positions. The controller 176 typically also includes instructions that enable programmable control of the velocity of movement of the linear movement L1 and thus also the linear movement L2 of the valve pin.

Figure 3:
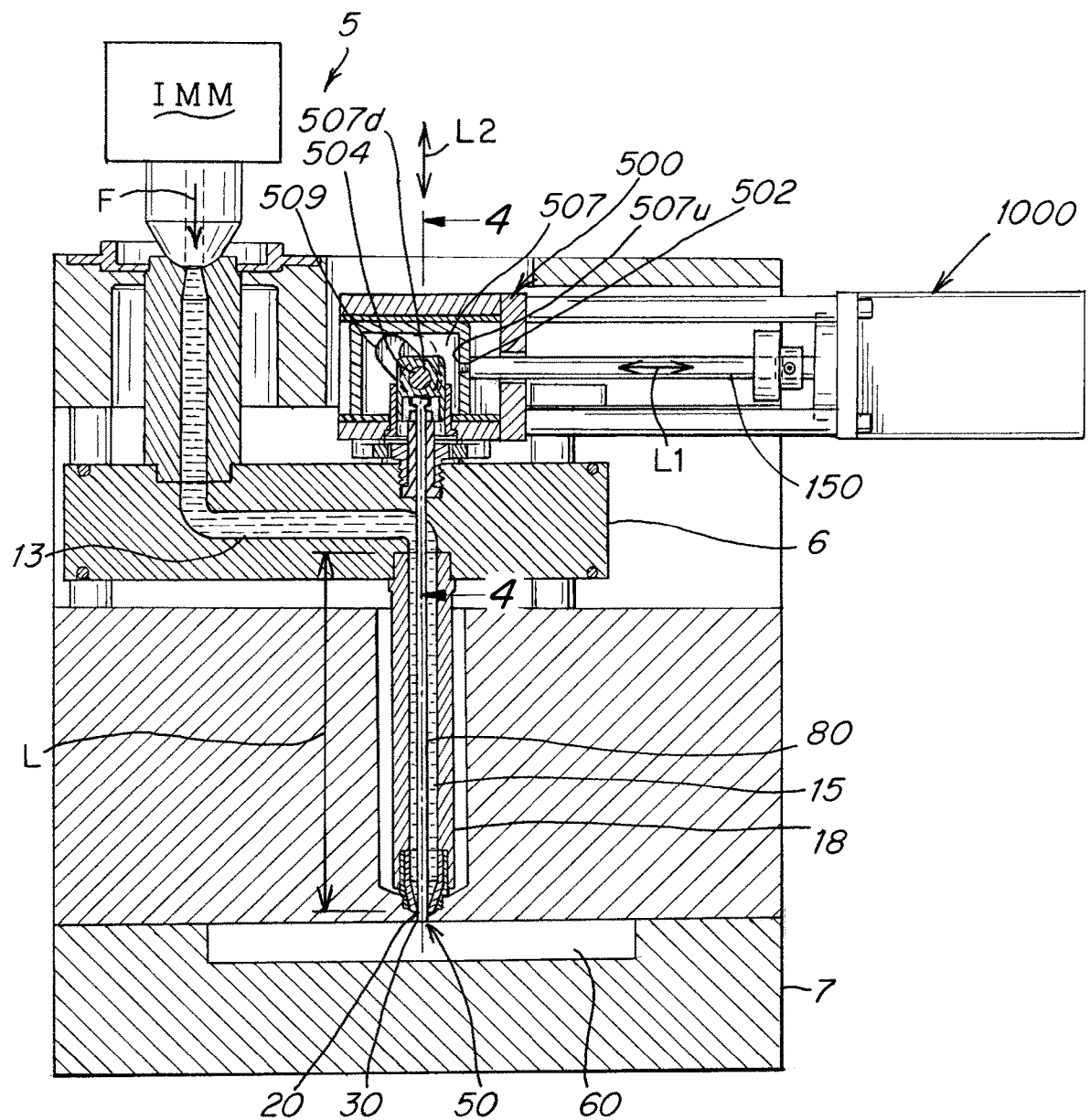
FIG. 3 is a side sectional view of an injection molding system taken along lines 3-3 of FIG. 2 showing one embodiment of an electric actuator interconnected to a version of a linear to linear movement conversion device the same as or similar to the devices shown in FIGS. 5-8.
Figure 4:
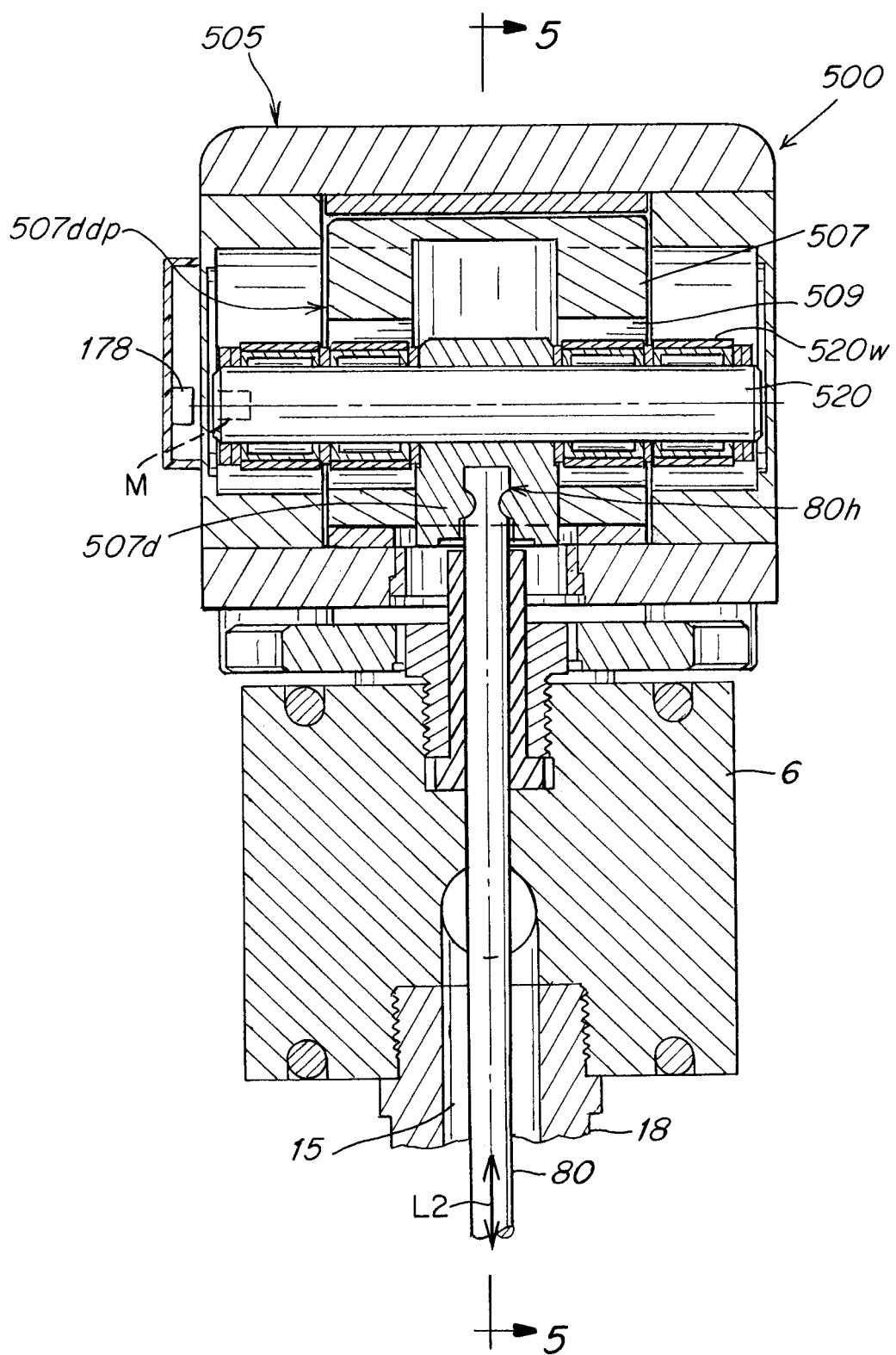
FIG. 4 is a sectional view taken along lines 4-4 of FIG. 3.
Figure 5:
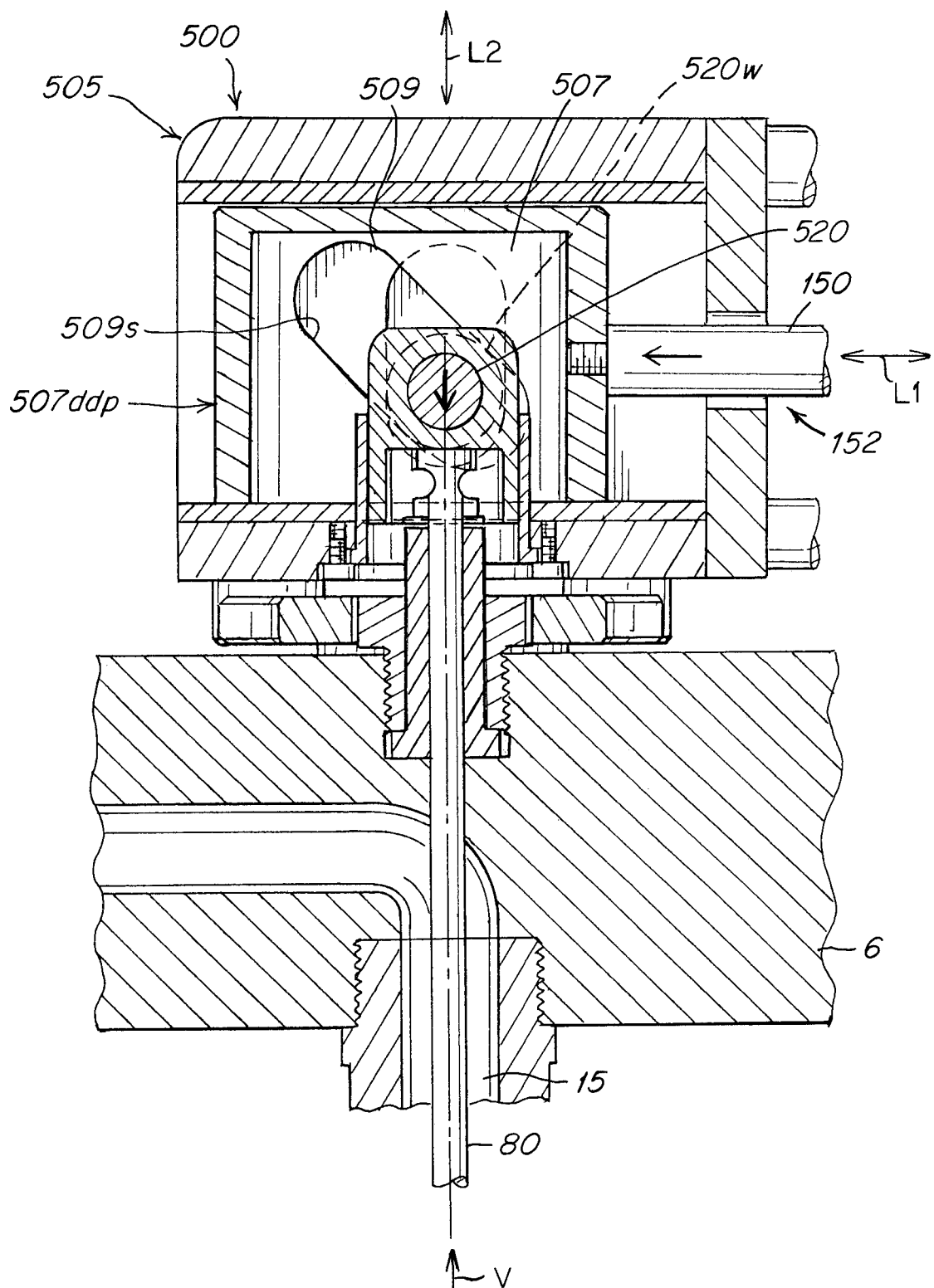
FIG. 5 is a sectional view taken along lines 5-5 of FIG. 4 showing the valve pin in a downstream gate closed position when the linearly driven component of the actuator is in a fully downstream extended position and the slotted linear to linear drive component has a straight or linearly configured drive guide slot.
Figure 6:
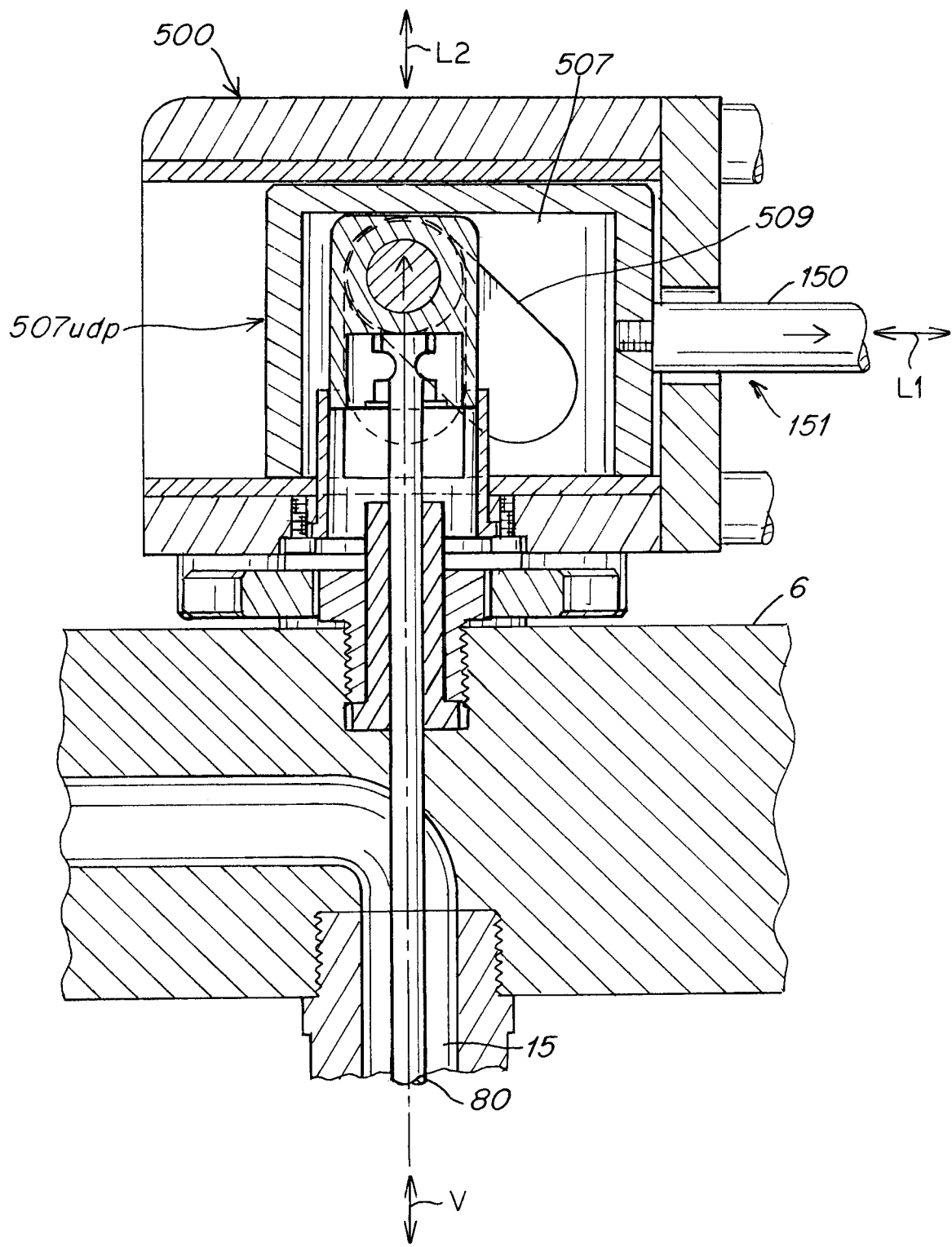
FIG. 6 is a sectional view similar to FIG. 5 showing the driven valve pin in an upstream gate open position when the slotted drive component of the actuator is in a fully upstream retracted position.
Figure 7:
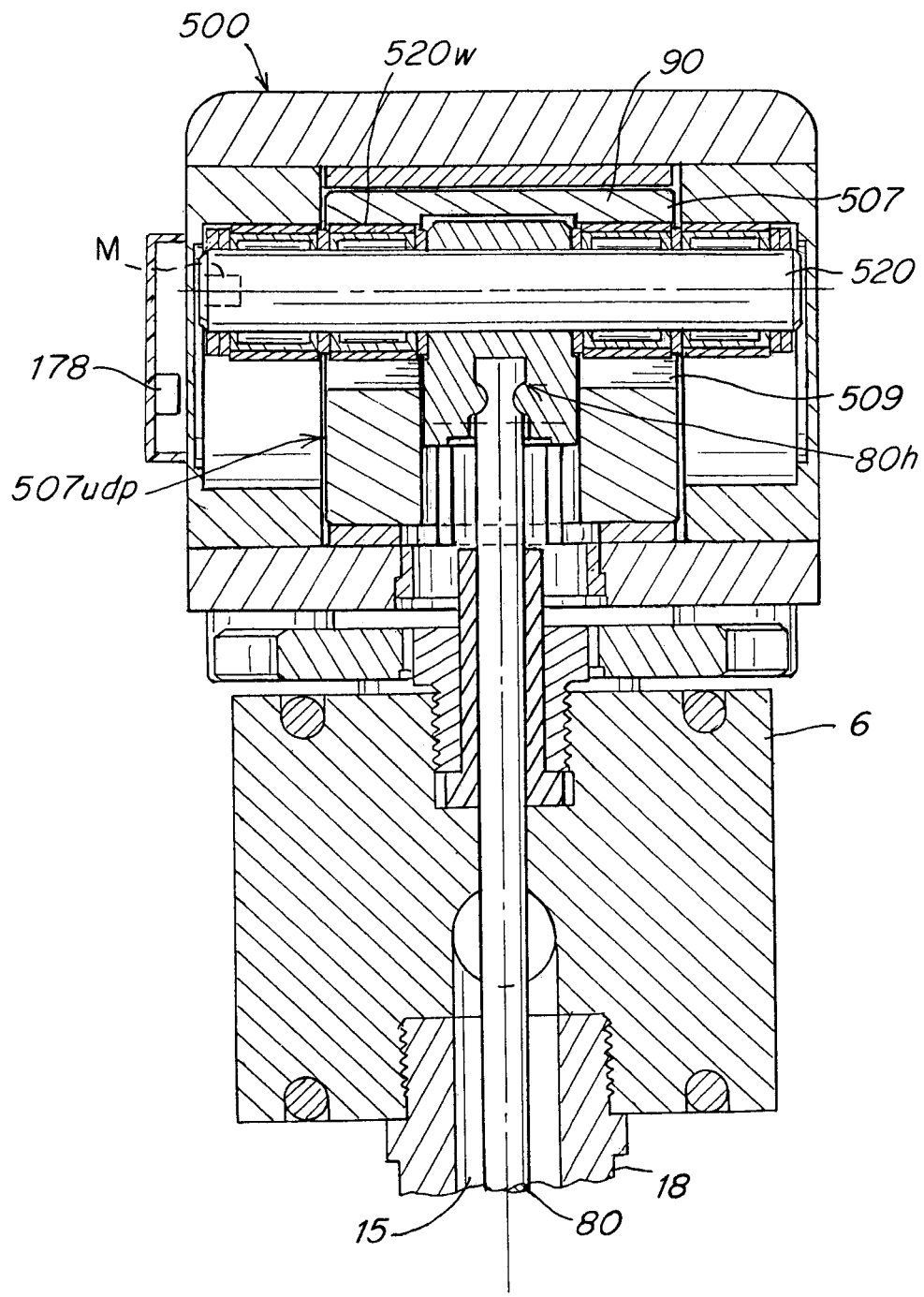
FIG. 7 is a sectional view similar to FIG. 4 showing the valve pin and linearly driven component in a fully upstream position.
Figure 8:
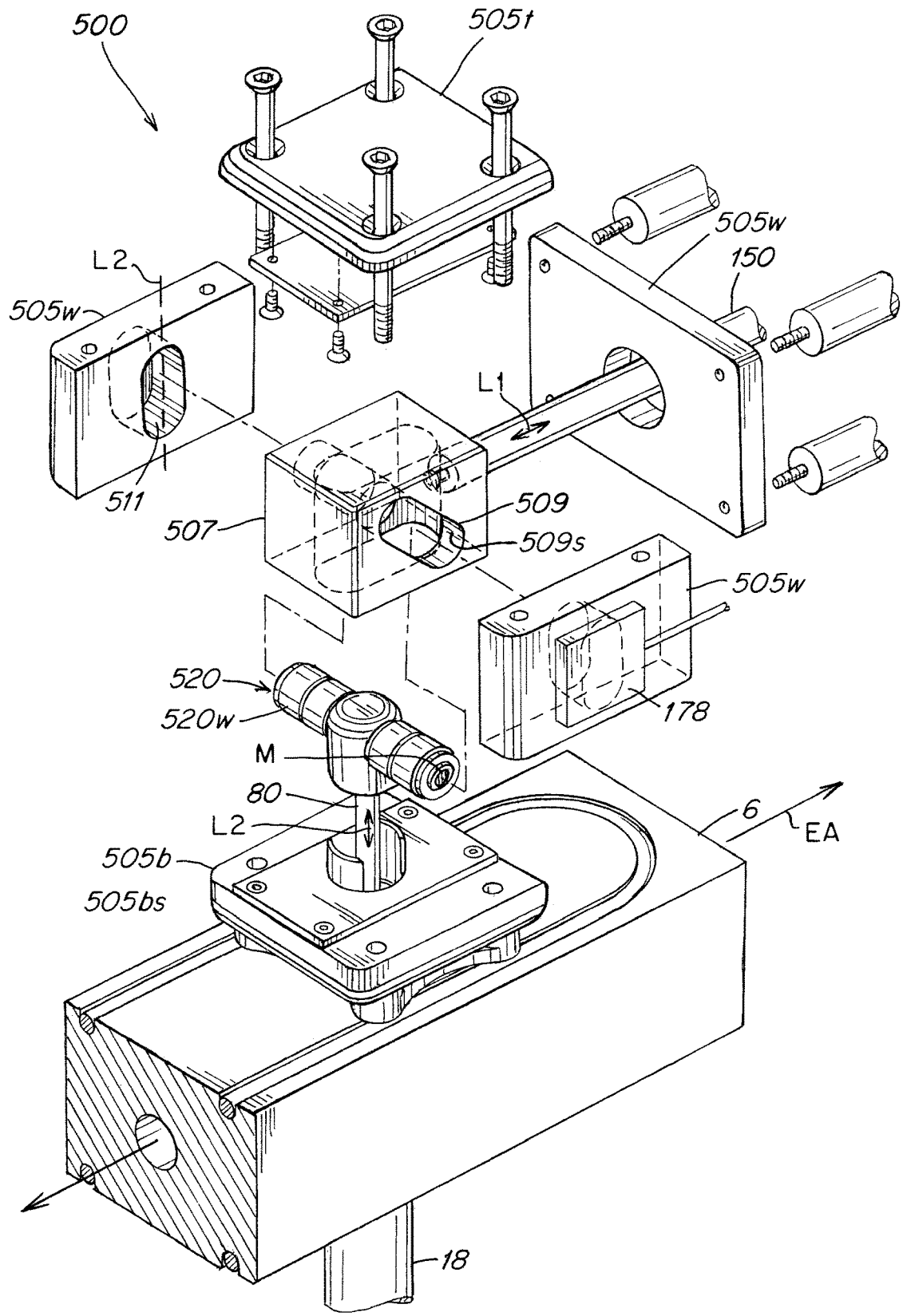
FIG. 8 is a top left side exploded perspective view of a subset of the components of an assembly as shown in FIGS. 4-7.

FIGS. 2, 3 shows the arrangement of an injection molding apparatus 5 that comprises an injection molding machine IMM that injects injection fluid F to a distribution channel 13 of a heated manifold 6 that in turn routes the injected fluid to the downstream flow passage 15 of a nozzle 18. Flow through the nozzle passage 15 into the cavity 60 of a mold 7 is controlled by a valve 10 comprised of a valve pin 80 driven along linear movement axis L2 by the actuator 1000 and linear to linear movement converter 500.

FIGS. 4-8 show one embodiment of a linear to linear movement converter 500 that is comprised of a sliding body 507 fixedly interconnected to the linear drive shaft 150 of the actuator 1000. An undersurface of the sliding body 507 is slidably mounted on a mounting surface 505bs of a bottom wall 505b of a subassembled body housing 505 such that the sliding body 507 is controllably drivable along the first linear drive axis L1 by controlled drive of the actuator 1000 with the controller 176. The sliding body 507 is formed to include an aperture or slot 509 within the body 507 that is configured and adapted to cause the valve pin 80 to be driven at one or more selected speeds along axis L2 in relation to the speed CV of drive of the actuator 1000. The upstream end 80h of the valve pin 80 is fixedly connected to a follower pin 520 around which is typically mounted one or more wheels 520w that are typically rotatably mounted on the follower pin 520. The housing 505, follower pin 520, valve pin and manifold are assembled such that the guide slot 509 receives the follower pin 520 and wheels 520w in an arrangement where the outside surfaces of the wheels 520w engage against the guide surface 509s of the slot 509. As the sliding body 507 is moved along axis L1 the slot 509 moves along axis L1 and the follower pin 520 is forced by engagement against the moving slot surface 509 to move along the non coaxial axis L2, the valve pin thus moving along the axis L2 together with movement of the sliding body 507 along axis L1. The speed of movement V of the valve pin 80 depends both on the contour or profile of the surface 509s of guide slot 509 and on the speed of movement CV of the linear drive member 150 of actuator 1000.

As shown in FIGS. 2-9, the actuator 1000, linear to linear movement converter 500, top clamp plate 5t, manifold 6, mold 7 and valve pin 80 are mounted stationarily relative to each other when assembled into an operating apparatus 5, it being understood that the manifold 6 expands laterally relative to the top clamp plate 5t and the mold 7 when the manifold 6 is heated to full operating temperature. Thus the housing 505 of the linear to linear movement converter 500 is mounted in a stationary position relative to the bushing 6b that mounts the pin 80 against lateral L1 movement except for radial movement of the pin 80 relative to the converter 500 when the manifold is heated to operating temperature. As shown, the shaft of the valve pin 80 is snugly received and mounted within a receiving aperture 6a of a bushing 6b that is fixedly mounted to the manifold such that the follower pin 520 resists and is prevented from travelling along L1 when force is exerted on the follower pin 520 in the L1 axis direction by virtue of compressed or forced engagement of the slot surface 509s, 509s1, 509s2 with the outside surface of the wheels 520w attached to the follower pin 520. Because of the arrangement of mounting of the valve pin 80 within bushing 6b and the fixed mounted of bushing 6b in manifold 6 relative to the actuator 1000, the follower pin 520 and pin 80 are is forced to travel along axis L2. As is well known the head 80h of the valve pin 80 is typically mounted within a complementary aperture of sliding body 507 that allows the head 80h of the valve pin 80 to move laterally within the aperture along a lateral axis generally parallel to the expansion axis EA of the manifold such that the pin 80 thus moves laterally EA together with lateral expansion movement of the manifold 6 when the converter housing 505 is not itself also mounted on or to the manifold 6.

Figure 10A:
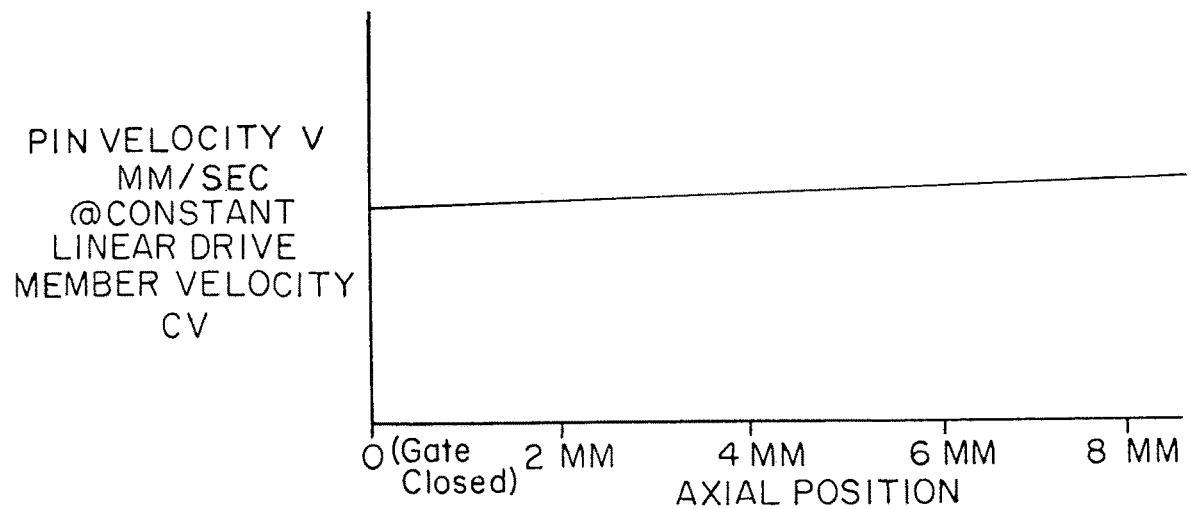
FIG. 10A is a plot of pin velocity versus axial position of the valve pin when using the FIGS. 5, 6 straight or linear slotted plate embodiment at a constant linear drive member velocity.

In the embodiment of FIGS. 4-8, the slot 509s has a linear or straight configuration such that the speed of movement V of valve pin 80 varies directly or linearly with the speed of movement CV of linear drive member 150. As shown in FIG. 10A when the slot 509 surface 509s is straight, the pin velocity V remains constant with constant linear drive member velocity CV.

Figure 9:
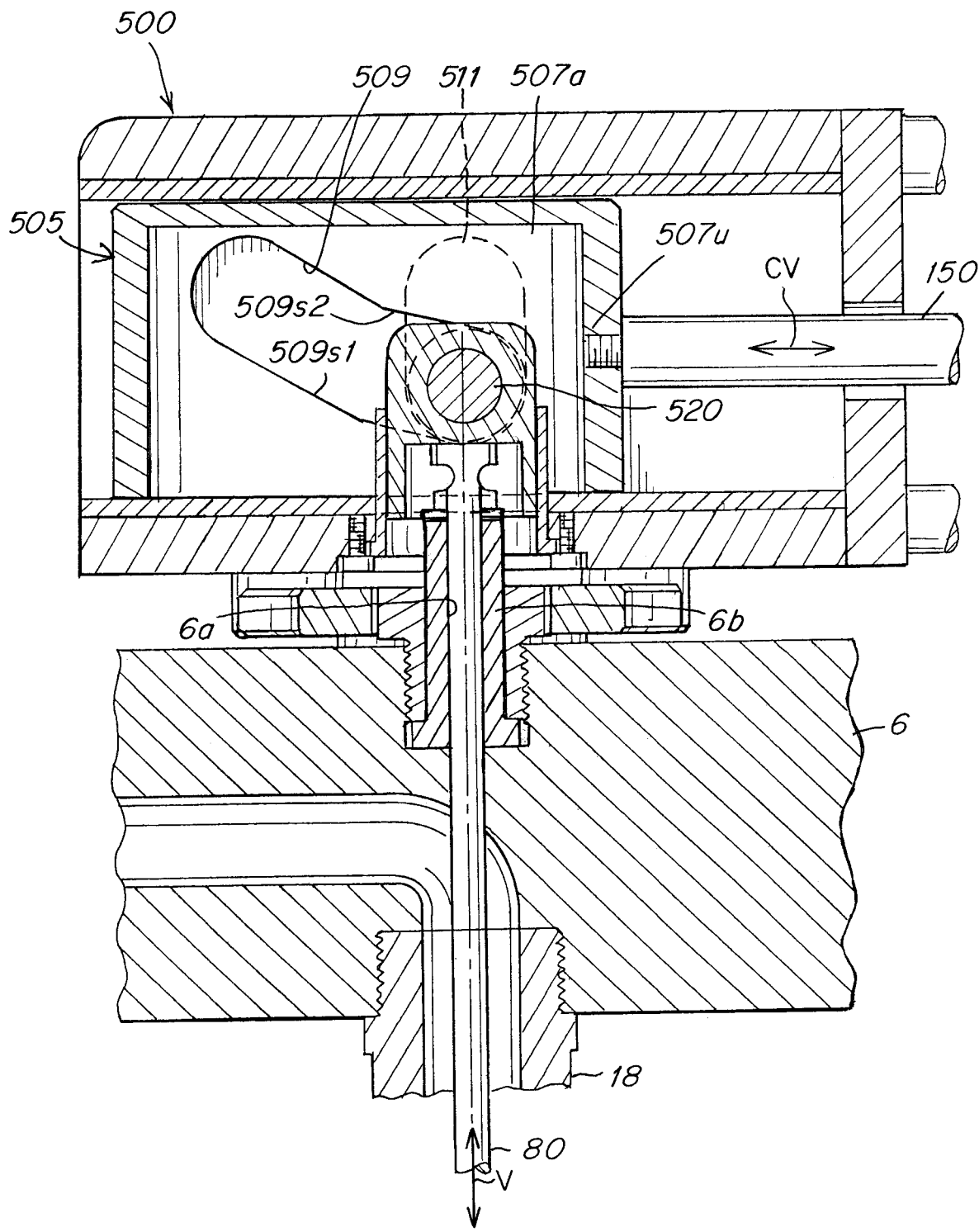
FIG. 9 is a view similar to FIG. 5 showing a linear conversion drive slide component having a stepped slot profile.
Figure 10B:
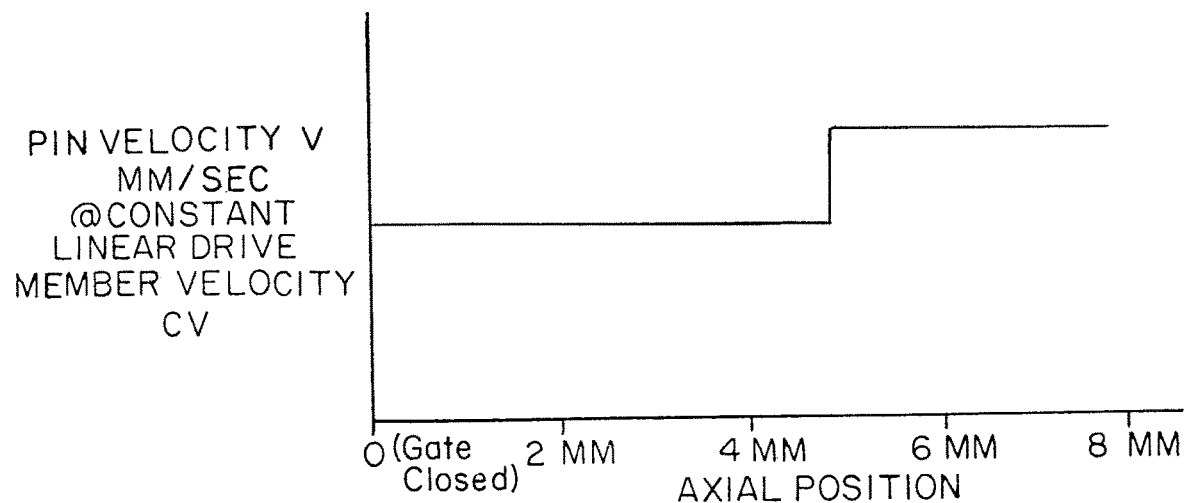
FIG. 10B is a plot of pin velocity versus axial position of the valve pin when using the FIG. 9 stepped slotted plate embodiment at a constant linear drive member velocity.
Figure 11:
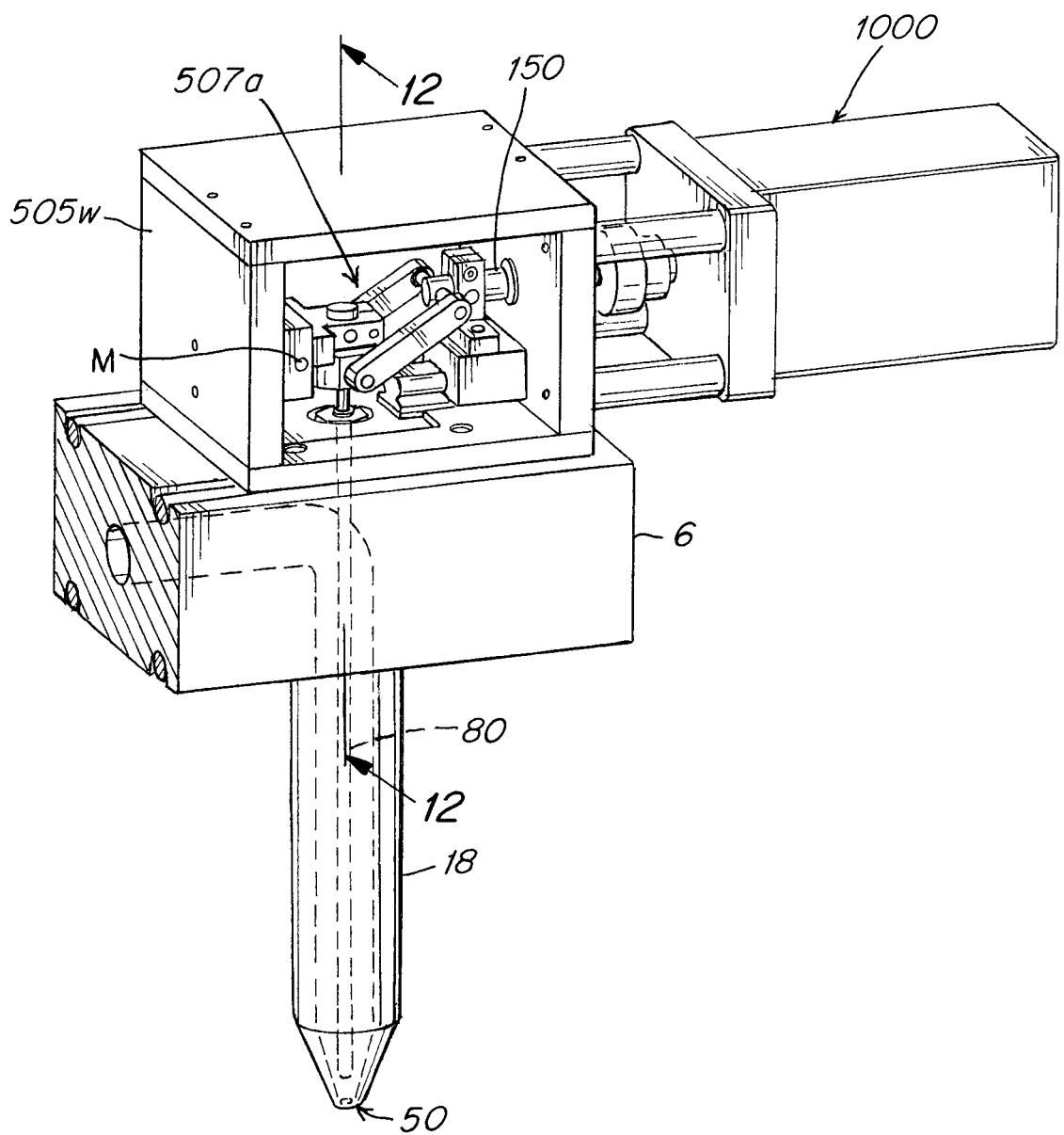
FIG. 11 is top left side perspective view of an electric actuator and linear to linear movement conversion or transfer device assembly showing a linear to linear converter device configured to use a pair of pivot arms interconnected between the drive shaft of the actuator and sliding linear drive converter component in an arrangement such that the sliding linearly driven component is driven at a progressively decreasing upstream to downstream velocity when the actuator drive shaft is driven at a constant velocity along a ninety degree path of travel relative to the path of travel of the sliding linearly drive component of the converter.

In the embodiment of FIG. 9 the slot 509 is shown to have a stepped surface configuration comprised of two separate steps 509s1, 509s2 of differing slopes or degrees of angle relative to linear movement axis L2 which results in the velocity V of valve pin 80 increasing when the valve pin 80 is withdrawn upstream and reaches the 5 mm, step 509s1 and greater or higher upstream positions. Thus the velocity of movement of the valve pin 80 along the L2 axis can be changed relative to a constant linear drive member 150 velocity CV as shown by FIG. 10B over the course of travel of the valve pin 80 between the downstreammost gate closed position and the fully upstream position by only the mechanical or geometrical configuration and arrangement of the linear to linear movement converter 500.

As can be readily imagined, the contour or profile of the slot 90 can be selected to be of any stepped, curved or other non linear configuration such that the velocity V of movement of the valve pin 80 along the linear axis L2 has any selected or predetermined non linear or varying correlation to the velocity of movement CV of the linear drive member 150, in particular such that the velocity V along axis L2 changes to one or more greater or less velocities over the course of travel of the valve pin 80 between gate closed and gate full open positions where the velocity of the linear drive member 150 is constant over the same course of travel of the valve pin 80. In such embodiments the speed or velocity V of movement of the valve pin 80 is changed on account of the mechanical configuration or arrangement of the linear to linear converter 500 or its operational components.

Figure 12:
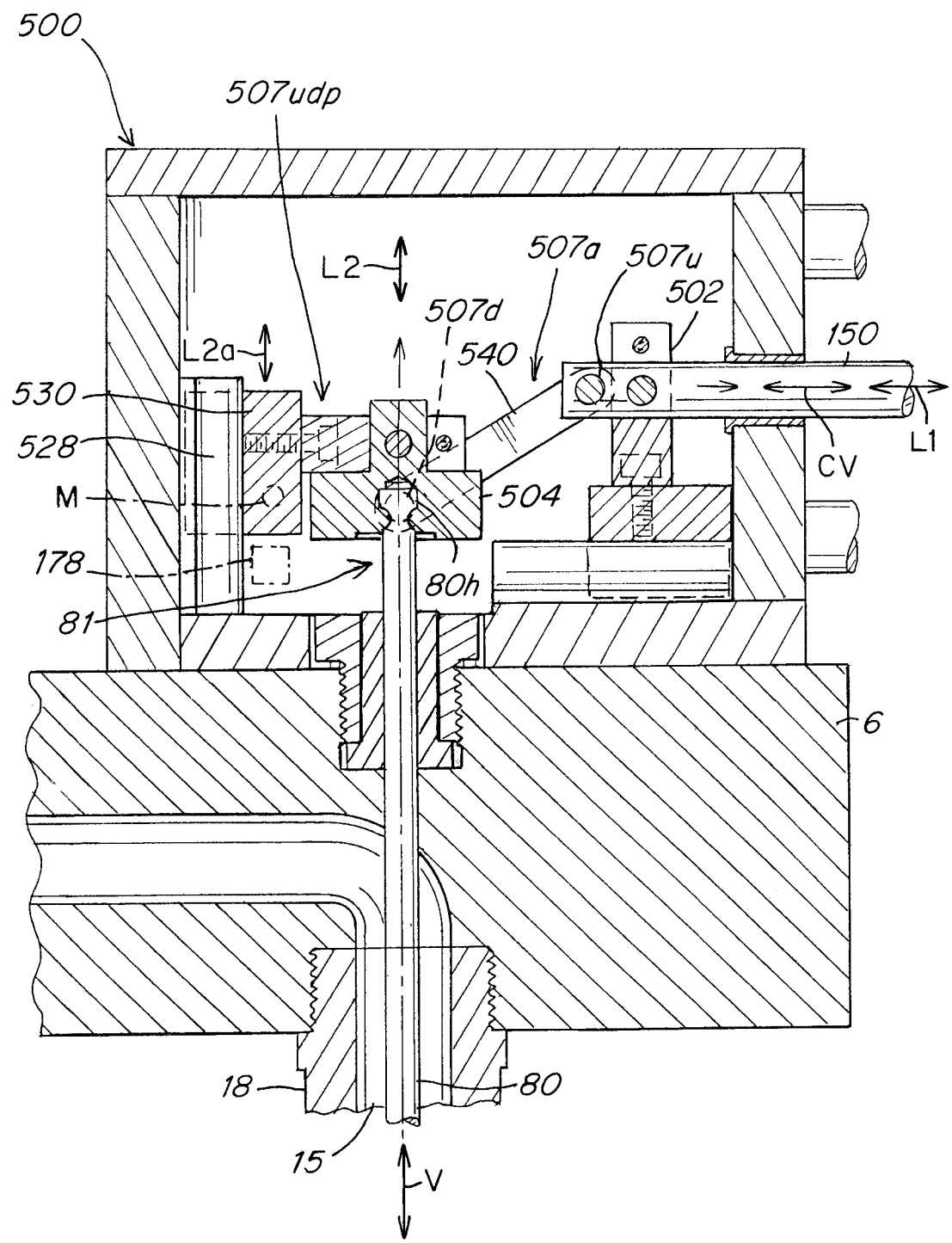
FIG. 12 is a sectional view taken along lines 12-12 of FIG. 11 showing the actuator drive shaft in a retracted drive position and the sliding linearly driven component of the converter in an upstream position.
Figure 13:
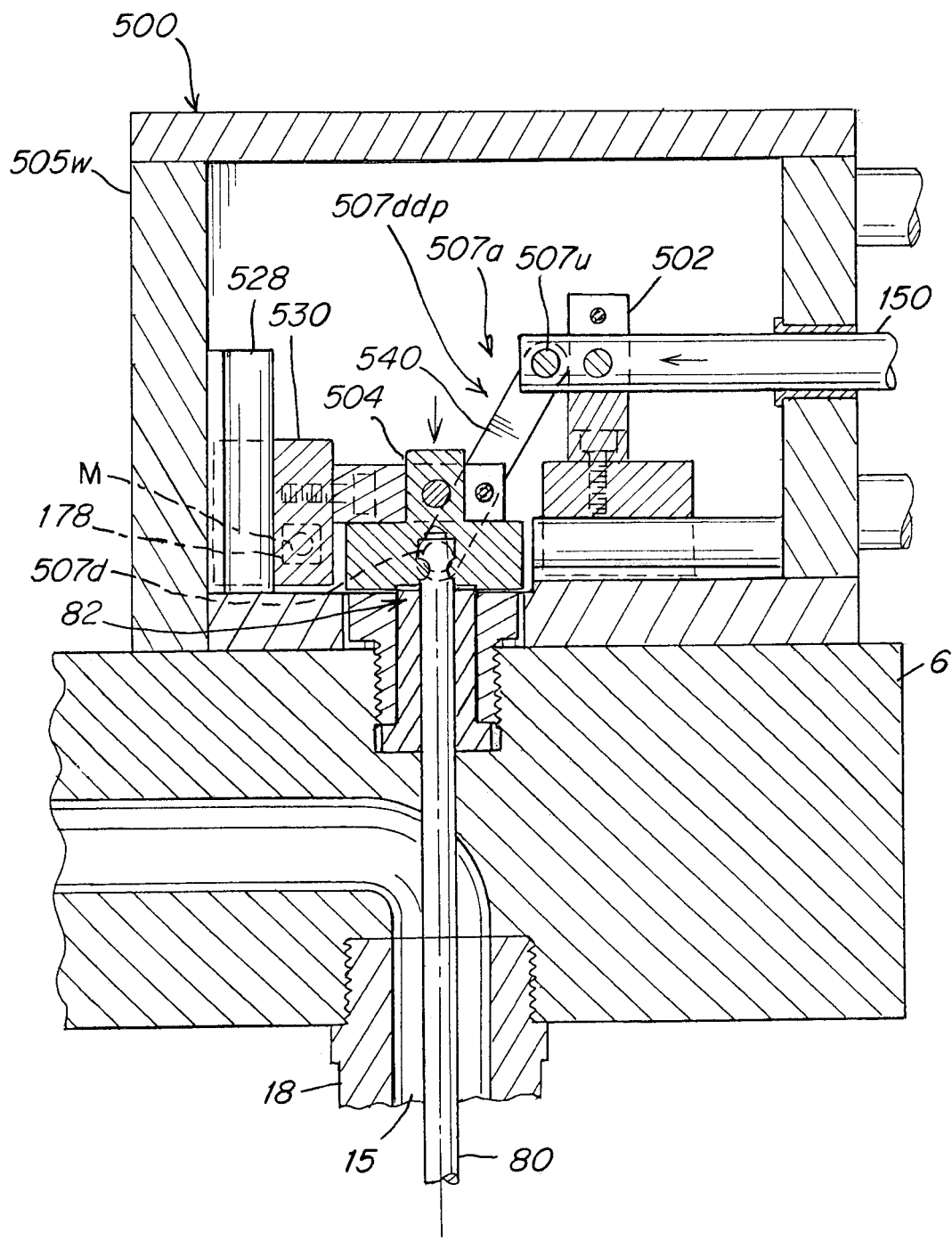
FIG. 13 is a view similar to FIG. 12 showing the actuator drive shaft of the FIG. 11 subassembly in an extended drive position and the sliding linearly driven component of the converter in a downstream position.
Figure 14:
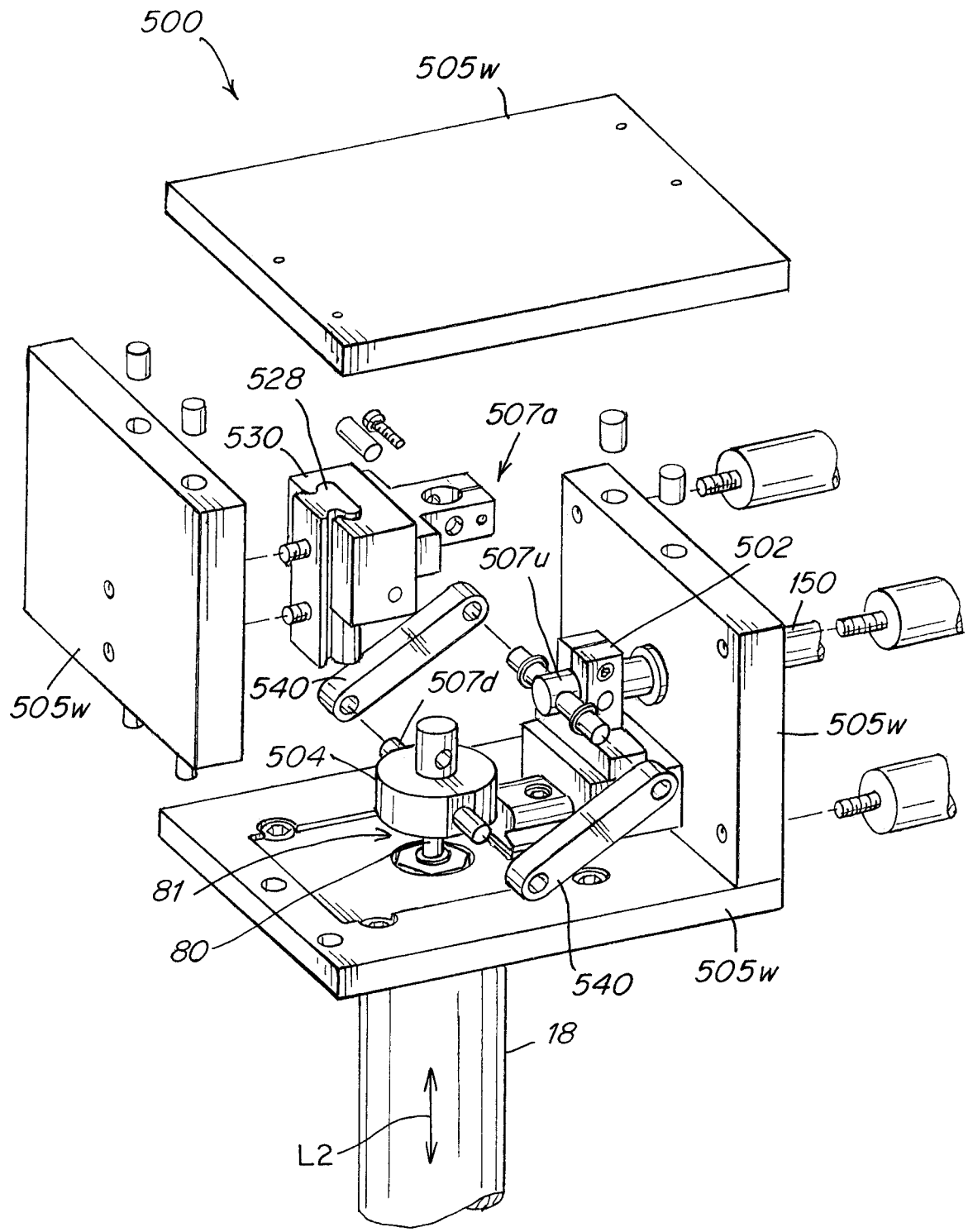
FIG. 14 is a top left exploded perspective view of the linear converter component of the FIG. 11 subassembly.

Another embodiment is shown in FIGS. 11-15 in which a valve (10) includes a linear to linear travel converter (500) comprised of a slide (530) interconnected to an upstream end (80h) of the valve pin (80). The slide 530 is adapted to mount the valve pin (80) for sliding movement along the second linear path of travel (L2). The linear to linear travel converter (500) includes a link device (540) that is pivotably interconnected between the linear drive member (150, 154, 158) and the slide (530) in an arrangement and configuration such that the links 540 drive the valve pin (80) along the first linear path of travel (L2) and the slide (530) along a complementary linear path of travel (L2a). As shown in FIG. 12, the links 540 are retracted to a fully upstream position by the linear drive member 150 which in turn pulls or drives the slide mount 530 and its interconnected valve pin 80 to their fully upstream positions at which the gate is fully open and injection flow is at its maximum with the gate being unrestricted by the distal tip end of the valve pin 80. FIG. 13 shows the links 540 extended to a fully downstream position by the linear drive member 150 which in turn pushes or drives the slide mount 530 and its interconnected valve pin 80 to their fully downstream positions at which the gate is fully closed and injection flow is stopped by the distal tip end of the valve pin 80 obstructing or closing the gate 50.

As shown in FIGS. 11-14, the links 540 are pivotably interconnected at an upstream end to the linear drive member 150 and pivotably interconnected at a downstream end to the slide member 530 via a pin connector 504 which is in turn fixedly interconnected to the upstream end 80h of the valve pin 80. Extension and retraction of the linear drive member 150 causes the links 540 to pivot upstream and downstream via their interconnection to the slide member 530 that is slidably mounted on a mounting or housing wall 505w of the converter 500. The converter 500 assembly includes mounting walls 505w that are stationarily mounted on or to one or the other of the top clamp plate 5t or manifold 6. The slide member 530 is in turn slidably mounted to a slotted guide or mount 528 that is fixedly attached to the mounting wall 505w such that the slide member 530 is limited in translational movement relative to the valve pin 80 along the L2 axis and not along the L1 axis.

Figure 15:
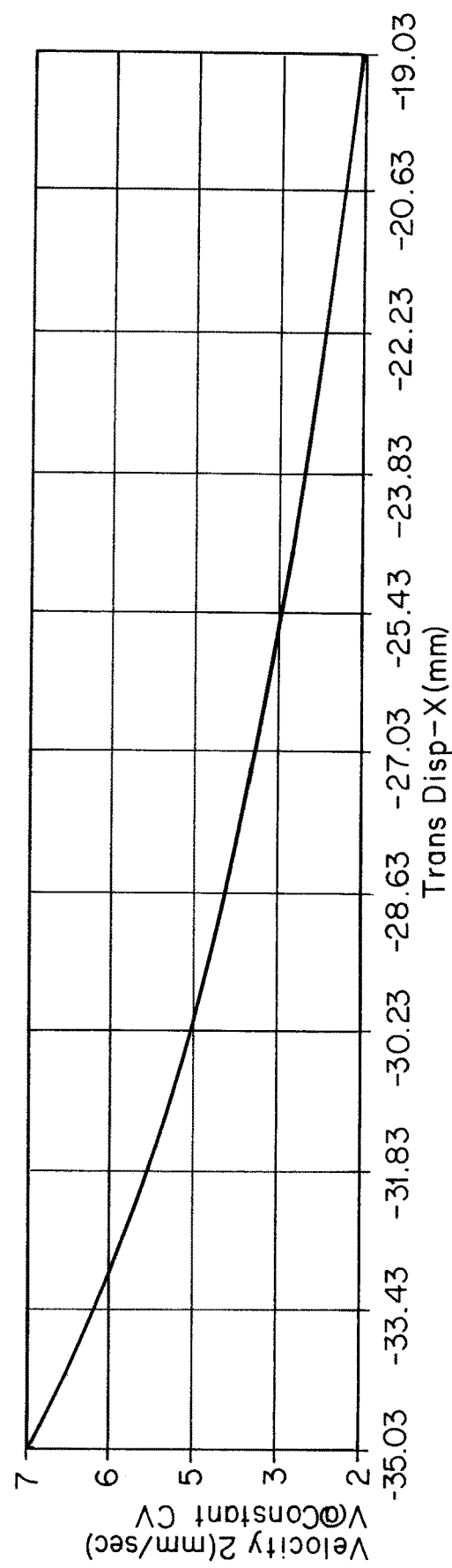
FIG. 15 is a plot showing the downstream driven velocity of the valve pin and sliding linearly driven component of the FIG. 11 subassembly as a function of the position of the drive shaft of the actuator when the drive shaft is driven at a constant velocity, the downstream velocity of the valve pin decreasing as the actuator shaft moves at a constant velocity, constant downstream or extended drive velocity input by the actuator yielding a decreasing downstream velocity output by the linearly driven component of the converter.

As shown in FIG. 15, the FIGS. 11-14 subassembly 500 of links 540, slide member 530, slide guide 528 are adapted and configured to change the velocity V of the valve pin 80 and slide 530 along axis L2 according to a non linear velocity profile as shown in FIG. 15 when the velocity CV of the linear drive member 150 is constant.

Figure 16:
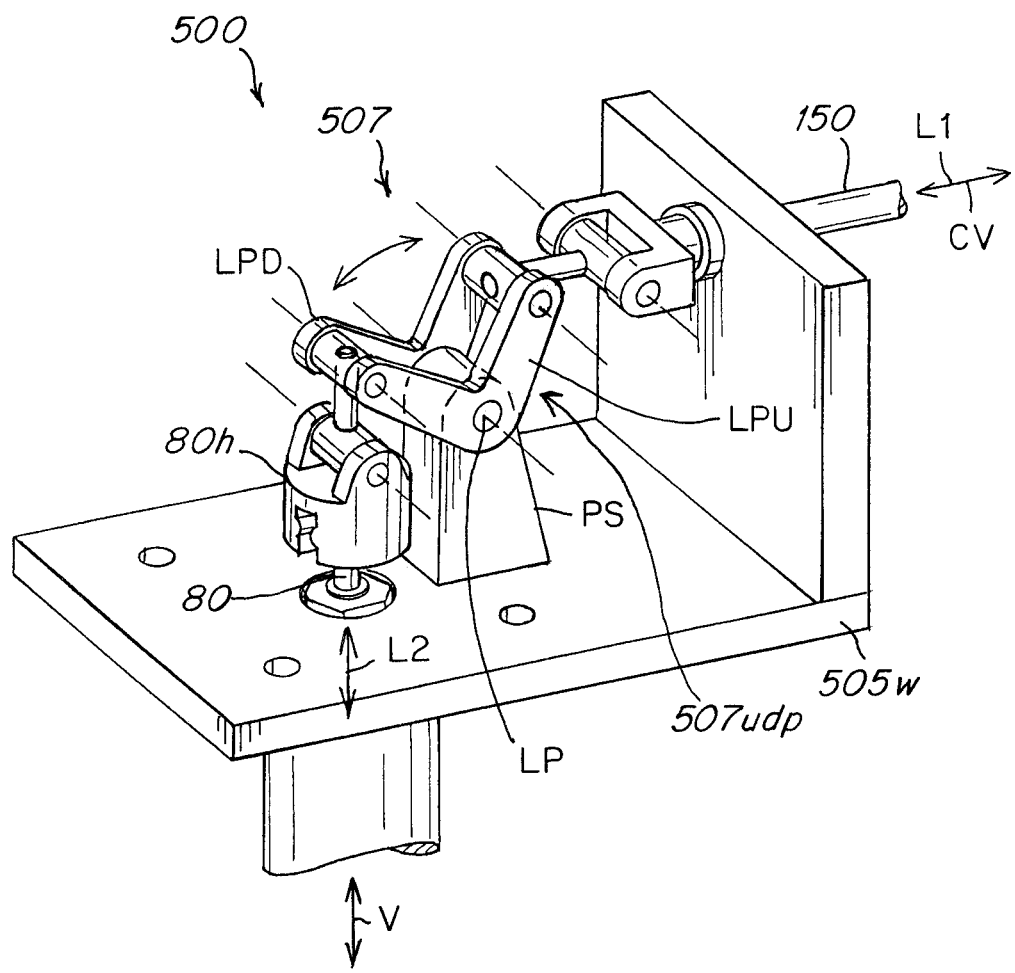
FIG. 16 is a top left perspective view of the downstream end of a linearly moving actuator shaft interconnected to another embodiment of a linear to linear conversion device comprised of a lever interconnected to a valve pin.
Figure 17:
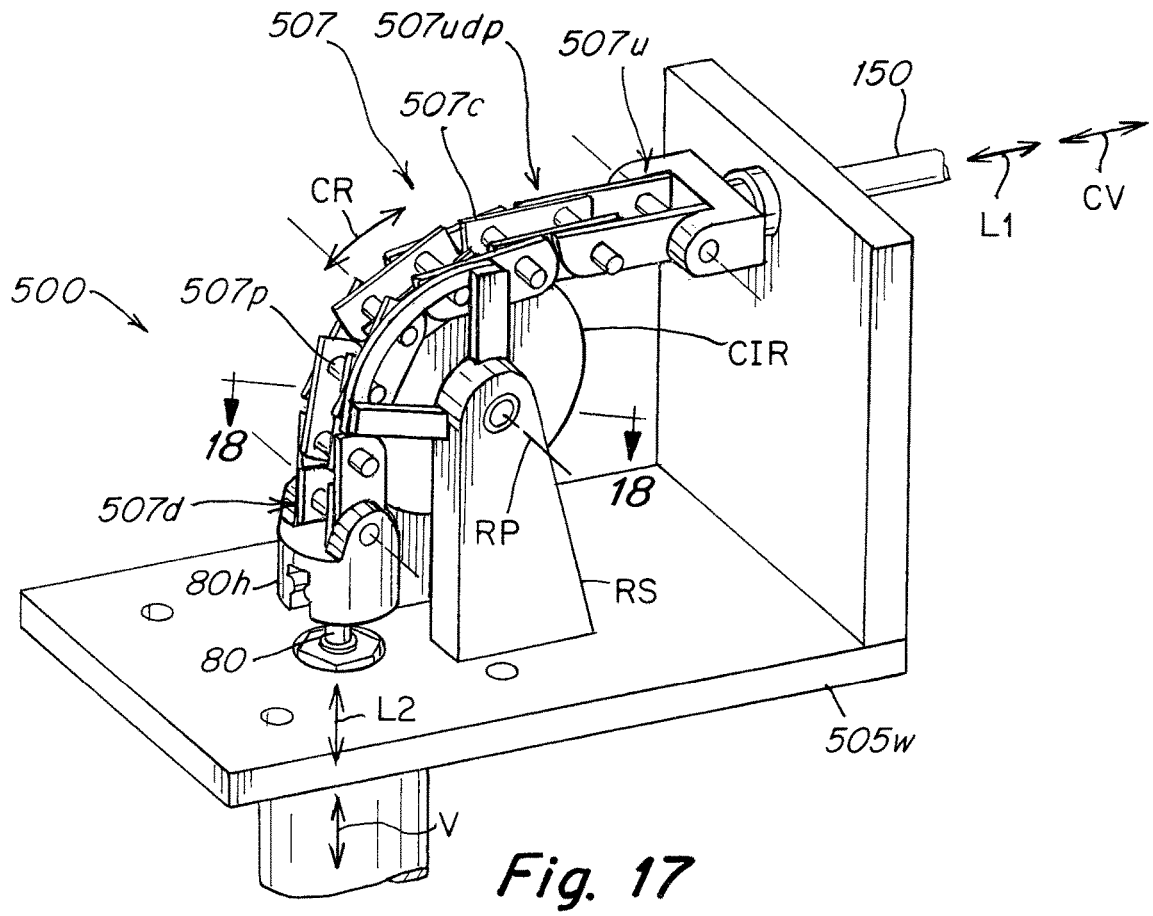
FIG. 17 is a top left perspective view of the downstream end of a linearly moving actuator shaft interconnected to another embodiment of a linear to linear conversion device comprised of a chain of links interconnected to a valve pin.
Figure 18:
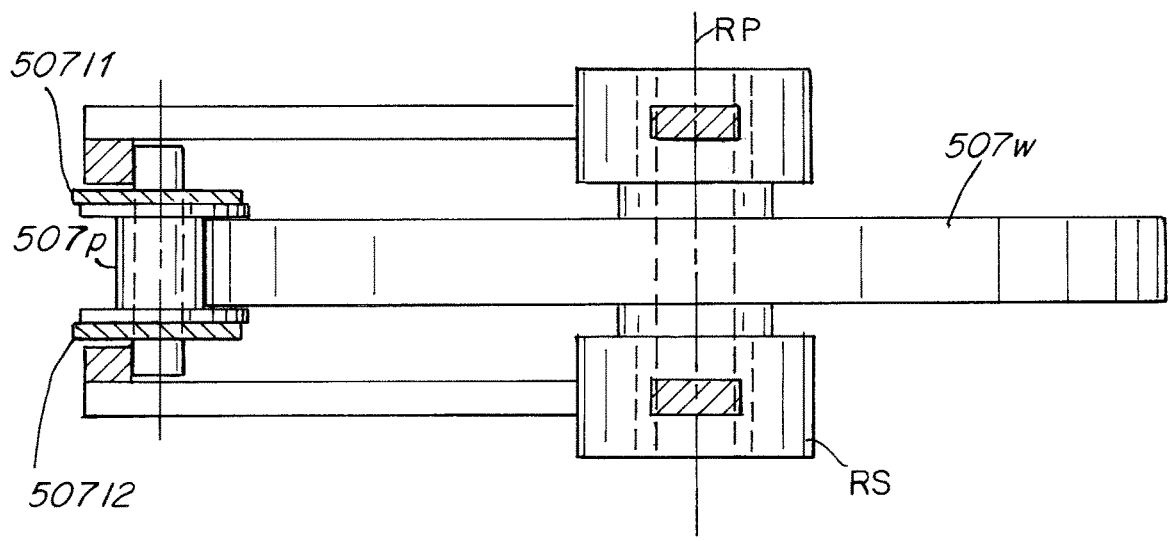
FIG. 18 is a sectional view taken along lines 18-18 of FIG. 17.

Other embodiments of linear to linear motion converters 500 are shown in FIGS. 16-18. FIG. 16 shows an embodiment where the converter 500 comprises a velocity adjuster 507 in the form of a lever arm comprised of an upstream arm LPU and downstream arm LPD fixedly or integrally connected to each other and pivotable around a pivot point LP that is rotatably mounted to a pivot support PS that is in turn fixedly mounted to a mounting wall 505w that is stationarily mounted to the system such as on or to the top clamp plate 5t or the manifold 6. The upstream end of the upstream arm LPU is pivotably connected to the linear drive member 150 for linear drive along axis L1 and concomitant pivoting of the velocity adjuster 507 around the pivot point LP. Driven movement of arm LPU along axis L1 results in driven movement of downstream arm LPD along axis L2 at a selected velocity or profile of velocities V relative to the velocity of movement CV of the linear drive member 150, the selected velocity or profile of velocities V is dependent on the selected configuration of the arms LPU, LPD.

FIG. 18 shows another embodiment of a linear to linear movement converter 500 comprised of a chain 507 that is comprised of a series of interlinked first and second links 50711, 50712 interconnected or linked by a link pin 507p. An upstream end of the chain 507 is connected to a downstream end of the linear drive member 150 for pushing and pulling the upstream end of the chain 507u along the linear direction or axis L1. As shown the downstream end 507p of the chain 507 is interconnected to the upstream end 80h of the valve pin 80 such that the pin 80 is controllably moved along the axis L2 by controlled movement of the linear drive member 150 along axis L1 with the converter chain 507 and wheel 507w transferring force and motion between the linear drive member 150 and the valve pin 80. The chain 507 is linkably engaged with the teeth of a rotational mounting wheel 507w that is rotatably mounted on a rotation pivot RP of a wheel mount RS that is stationarily mounted to a converter housing wall or mount 505a that is fixedly mounted to either the top clamp plate 5t or heated manifold 6. The chain 507 is configured such that its pins 507p interlink to the teeth of the guide wheel 50w thus enabling the chain 507 to freely travel in path CR defined by the contour of the circumference CIR of the chain. The relative size, contour and arrangement of the components of the converter 500 of FIGS. 17, 18 including the size, contour and arrangement of one or more of the links 50711, 50712, link pins 507p, contour CIR of the wheel 507w, diameter of the wheel 507w and location or spatial disposition of the rotation axis RP can be selected such that the speed or velocity V of the valve pin 80 relative to the speed or velocity CV of the linear drive member over the course of travel of the valve pin between a gate closed downstream position and an upstream gate open position can be selectively predetermined.

The velocity V of movement of the valve pin 80 can be further controlled according to any profile over the course of movement between fully downstream (gate closed) and fully upstream (fully gate open) positions by control of the velocity CV of movement of the linear drive member 150 via control through the controller 176 of the rotational velocity and direction of the actuator 1000. In such embodiments, the controller can include a program that includes programmable instructions that control the direction and rate of rotational drive of the rotor of an electric actuator 1000.

What is claimed is:

1. In an injection molding system (5) comprised of an injection molding machine (IMM), a distribution manifold (6) for receiving a selected injection fluid (F) from the injection molding machine (IMM), a valve (10) comprising a flow passage (15) receiving the injection fluid (F) from the manifold (6) having a longitudinal length (L) and a downstream tip end exit aperture (20), a mold (7) having a cavity (60) having a cavity entrance aperture (30), the exit aperture (20) being fluid sealably matable with the cavity entrance aperture (30) to form a gate aperture (50), wherein the injection molding machine (IMM) injects said injection fluid (F) to the manifold (6) which distributes the injection fluid for injection downstream through the flow passage (15) of the valve (10) and further downstream to and through the exit aperture (20) and further downstream to and through the gate aperture (50) into the cavity (60) of the mold (7), the valve (10) comprising an actuator (1000) that includes a linear drive member (150, 154, 158) that is reciprocally driven back and forth along a first linear path of travel (L1), a valve pin (80) that is adapted to travel linearly upstream and downstream within the flow passage (15) between pin upstream (81) and pin downstream (82) positions along a second linear path of travel (L2) that is non-coaxial relative to the first linear path of travel (L1), the actuator (1000) being interconnected to the valve pin (80) in an arrangement wherein movement of the linear drive member (150, 154, 158) along the first linear path of travel (L1) drives the valve pin (80) along the second linear path of travel (L2), wherein the linear drive member (150, 154, 158) is interconnected to an upstream end (502, 507u) of a linear to linear travel converter (500) and the valve pin (80) is interconnected to a downstream end (504) of the linear to linear travel converter (500), the upstream end (502, 507u) of the linear to linear travel converter (500) being driven along the first linear path of travel (L1) by the linear drive member (150, 154, 158) and the downstream end (504, 507d) of the linear to linear travel converter (500) being adapted to drive the valve pin along the second linear path of travel (L2), the linear to linear travel converter (500) comprising:

a converter housing (505) stationarily mounted on to the manifold (6), a sliding body (507) fixedly interconnected to the linear drive member (150, 154, 158) and slidably mounted to a wall of the converter housing (505) such that the sliding body (507) is controllably drivable along the first linear path of travel (L1), a guide slot (509) within the sliding body (507), a follower pin (520) fixedly connected to an upstream end (80h) of the valve pin (80), the follower pin (520) being received within the guide slot (509) such that as the sliding body (507) is moved along the first path (L1) the guide slot (509) moves along the first linear path of travel (L1) and the follower pin (520) is forced by engagement against a moving guide slot surface (509s) of the guide slot (509) to move along the second linear path of travel (L2), while the guide pin (80) also moves along the second linear path of travel (L2), wherein the converter housing (505) has slots (511) aligned along the second linear path of travel (L2) in opposing walls (505w) of the converter housing (505) that receive and guide movement of the follower pin (520) along the second linear path of travel (L2).

2. The system according to claim 1 wherein the linear to linear travel converter (500) is adapted to pivot or travel between an upstream drive position (507udp) and a downstream drive position (507ddp) that correspond respectively to travel of the valve pin (80) between the pin upstream (81) and pin downstream (82) positions.

3. The system according to claim 1 wherein the linear to linear travel converter (500) is adapted to pivot or travel linearly along the first linear path of travel (L1) in response to being driven by the linear drive member (150, 154, 158).

4. The system according to claim 1 wherein the linear drive member (150, 154, 158) is adapted to travel between an upstream drive position (151) and a downstream drive position (152) that correspond respectively to travel of the valve pin (80) between the pin upstream (81) and pin downstream (82) positions, the linear to linear travel converter (500) being adapted to mechanically change velocity (V) of travel of the valve pin (80) during the course of travel of the valve pin (80) between the pin upstream (81) and pin downstream (82) positions when the linear drive member is driven at a constant velocity (CV).

5. The system according to claim 1 wherein the linear to linear travel converter includes a velocity adjuster (507) interconnected at an upstream end (507u) to the linear drive member (150, 154, 158) and at a downstream end (507d) to the valve pin (80), the velocity adjuster (507) being adapted to mechanically change velocity (V) of travel of the valve pin (80) during the course of travel of the valve pin (80) between the pin upstream (81) and pin downstream (82) positions when the linear drive member is driven at a constant velocity (CV).

6. The system according to claim 1 wherein the actuator (1000) comprises an electric motor or electrically powered device.

7. The system according to claim 1, wherein the actuator (1000) includes a screw (158) or a nut (154) that is rotatably driven by the electric motor or electrically powered device, the screw (158) or nut (154) being screwably engaged with the linear drive member (150, 154, 158) in an arrangement wherein the linear drive member (150, 154, 158) is driven along the first linear path of travel (L1) on driven rotation of the screw (158) or nut (154).

8. The system according to claim 1, further including a position detector (178) that senses linear position of the valve pin (80).

9. The system according to claim 1, further including a controller (176) that includes a program that receives a position detection signal from a position detector (178), the program including instructions that controllably drive the actuator (1000) based on use of the position detection signal as an input.

10. The system according to claim 9, wherein the position detector (178) comprises a Hall effect sensor.

11. The system according to claim 9, wherein the controller (176) includes instructions that control rate, direction or timing of driven movement (V) of the actuator (1000) during the course of an injection cycle.

12. A method of performing an injection cycle comprising injecting a selected injection fluid (F) into a cavity (60) of a mold (7) using the system according to claim 1.

13. The system according to claim 1, wherein the guide slot surface (509s) being configured to drive the valve pin (80) along the second linear path of travel (L2) at one or more speeds or velocities of linear travel (V) when the linear drive member (159, 154, 158) is driven at a constant velocity (CV).

14. The system according to claim 13, wherein the guide slot surface (509s) is configured to drive the valve pin (80) at least two different speeds or velocities (V) during the course of travel of the valve pin (80) between the pin upstream (81) and pin downstream (82) positions.

15. The system according to claim 1, wherein:

the sliding body (507) has two guide slots (509, 509) configured such that as the sliding body (507) is moved along the first linear path of travel (L1) each guide slot (509, 509) moves along the first linear path of travel (L1) and the follower pin (520) is forced by engagement against the moving slot surfaces (509s, 509s) of the two guide slots (509, 509) to move along the non-coaxial second path (L2) for controlling the upstream and downstream movement of the valve pin (80), and the converter housing (505) has two opposing walls (505w, 505w) each having a slot (511, 511) aligned along the second linear path of travel (L2).

\* \* \* \* \*